United States Patent
Lee et al.

(10) Patent No.: US 8,159,979 B2
(45) Date of Patent: Apr. 17, 2012

(54) ENHANCED TDD FRAME STRUCTURE

(75) Inventors: Ki-Dong Lee, San Diego, CA (US);
Li-Hsiang Sun, San Diego, CA (US);
Shu Wang, San Diego, CA (US); Sang Gook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 12/352,498

(22) Filed: Jan. 12, 2009

(65) Prior Publication Data
US 2009/0180410 A1 Jul. 16, 2009

Related U.S. Application Data

(60) Provisional application No. 61/020,689, filed on Jan. 11, 2008.

(51) Int. Cl.
*H04J 3/00* (2006.01)
*H04J 1/00* (2006.01)
*H04W 72/04* (2009.01)

(52) U.S. Cl. ......... 370/280; 370/281; 370/330; 370/343

(58) Field of Classification Search .................. 370/294, 370/328, 342, 321, 329, 279–281, 343–345, 370/330; 455/450
See application file for complete search history.

(56) References Cited

U.S. PATENT DOCUMENTS

| | | | |
|---|---|---|---|
| 7,519,011 B2 * | 4/2009 | Petrus et al. | 370/280 |
| 7,876,840 B2 * | 1/2011 | Tong et al. | 375/260 |
| 2007/0072604 A1 | 3/2007 | Wang | |
| 2007/0097945 A1 | 5/2007 | Wang | |
| 2007/0217367 A1 * | 9/2007 | Lee et al. | 370/335 |
| 2008/0095195 A1 * | 4/2008 | Ahmadi et al. | 370/478 |
| 2008/0137583 A1 * | 6/2008 | Sydir et al. | 370/315 |
| 2009/0067377 A1 * | 3/2009 | Talukdar et al. | 370/329 |
| 2009/0092085 A1 * | 4/2009 | Ramesh et al. | 370/329 |
| 2009/0131110 A1 * | 5/2009 | Balachandran et al. | 455/561 |
| 2009/0147742 A1 * | 6/2009 | Tsai et al. | 370/329 |
| 2009/0161528 A1 * | 6/2009 | Vaidya et al. | 370/203 |
| 2009/0219875 A1 * | 9/2009 | Kwak et al. | 370/329 |

* cited by examiner

*Primary Examiner* — Kwang B Yao
*Assistant Examiner* — Candal Elpenord
(74) *Attorney, Agent, or Firm* — Lee, Hong, Degerman, Kang & Waimey

(57) ABSTRACT

A method of providing uplink and downlink transmissions between a mobile terminal and a base station in a mobile communication system is provided. The method increases the flexibility and efficiency of a mobile communication system utilizing one or more relay entities and provides new frame structures to support legacy and new transmissions in a mobile communication system.

8 Claims, 26 Drawing Sheets

FIG. 2
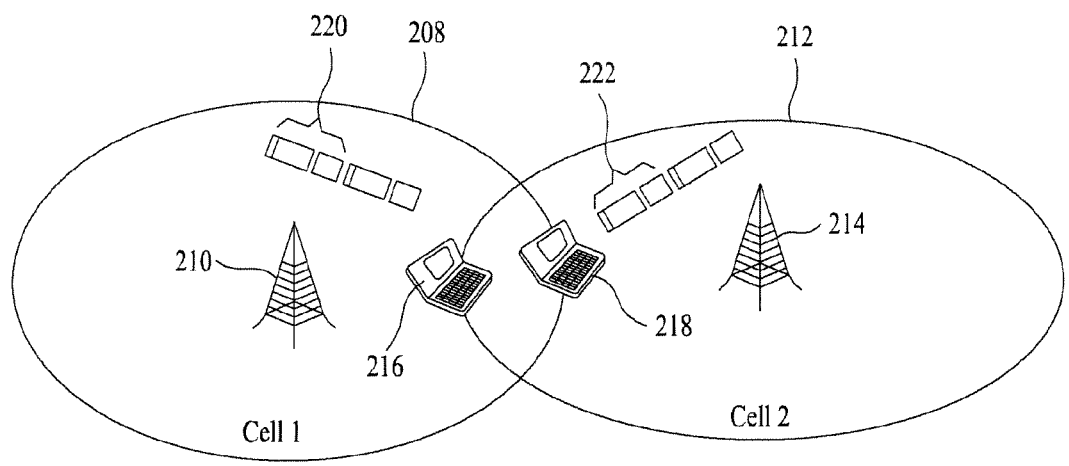
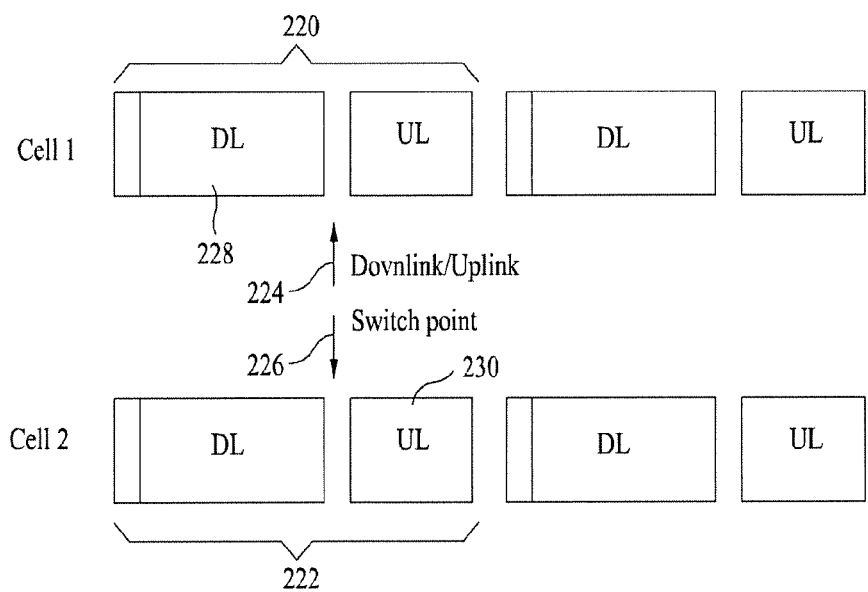

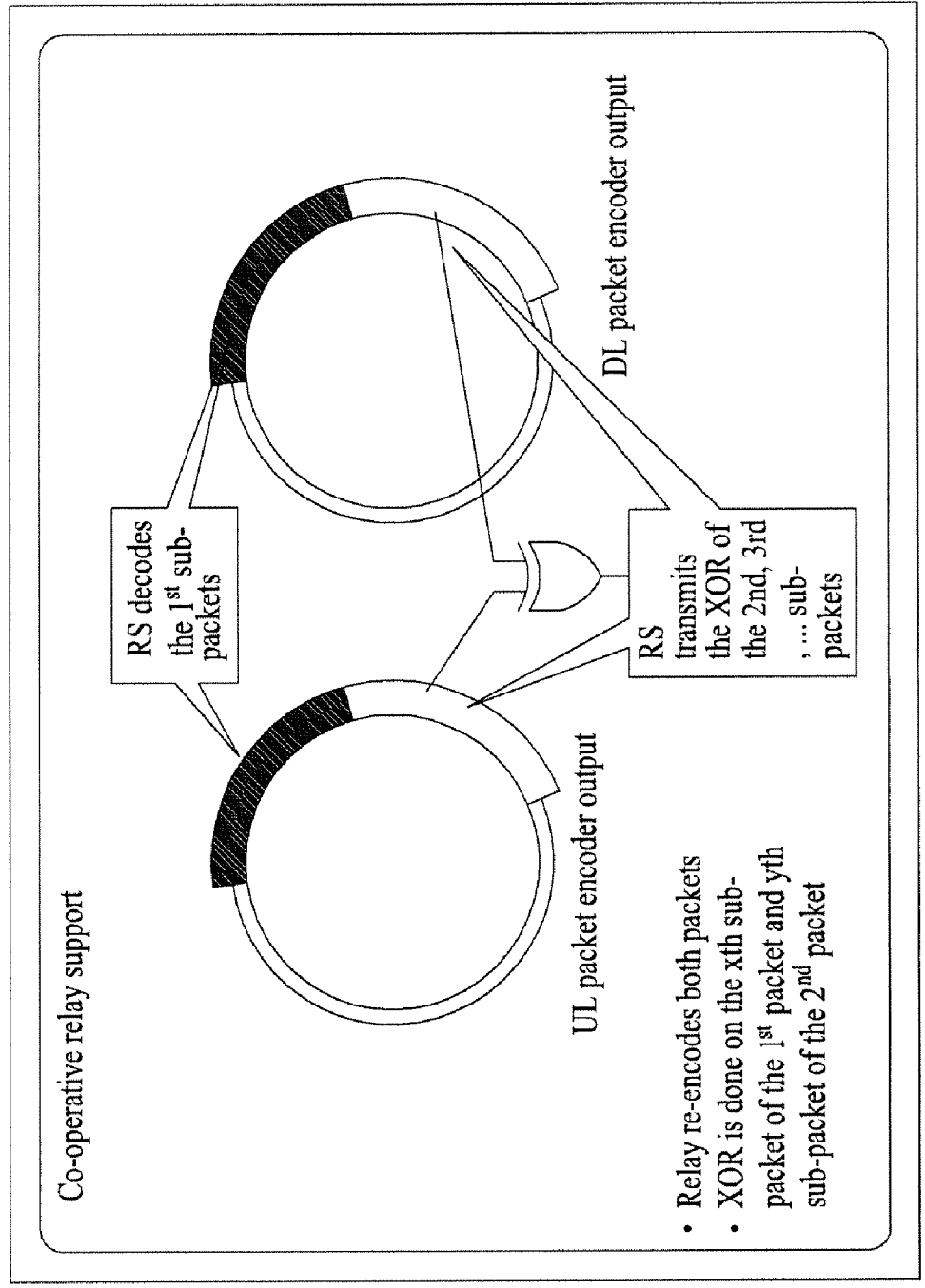

ENHANCED TDD FRAME STRUCTURE

CROSS-REFERENCE TO RELATED APPLICATIONS

Pursuant to 35 U.S.C. §120, this application claims the benefit of U.S. Provisional Application Ser. No. 61/020,689 filed on Jan. 11, 2008, the contents of which is hereby incorporated by reference herein in its entirety.

FIELD OF THE INVENTION

The present invention relates to mobile communication systems, and particularly, to the use of an enhanced Time Division Duplex ("TDD") frame structure capable of supporting both legacy and advanced frame structures.

DESCRIPTION OF THE RELATED ART

In communication systems utilizing a Time Division Duplex ("TDD") scheme, the downlink ("DL") transmission from a base station (also referred to in the art as "an access point") to one or more mobile stations (are also referred to in the art as an "access device" or "access terminal") and the uplink ("UL") transmission from a mobile station to a base station are duplexed in the time domain. In the TDD scheme, the DL and UL transmissions are in the same frequency band. However, the TDD scheme can also be implemented using different frequency bands.

In the TDD scheme, one or more UL transmissions are initiated only after one or more DL transmissions are completed, and one or more DL transmissions are initiated only after one or more UL transmissions are completed. An example of a TDD transmission frame structure for mobile Worldwide Interoperability for Microwave Access (WiMAX) IEEE 802.16e is shown in FIG. 1.

With reference to transmission frame 101 in FIG. 1, the period between a DL transmission, such as DL transmission 102, and a UL transmission, such as UL transmission 104, within a single frame is a DL/UL switching point, such as DL/UL switching point 106. In order to minimize the interference between a DL transmission from a base station of one cell and a UL transmission from a base station of a different cell, the DL/UL switching points of the base stations of the cells are typically synchronized. An example of such synchronization is shown in FIG. 2.

FIG. 2 shows "Cell 1," which includes base station 210, and "Cell 2," which includes base station 214. As also shown in FIG. 2, "Cell 1" has a communication range 208 and "Cell 2" has a communication range 212.

In FIG. 2, base station 210 of "Cell 1" is configured to communicate with mobile station 216 via a sequence of frames, such as frame 220, and base station 214 of "Cell 2" is configured to communicate with mobile station 218 via a sequence of frames, such as frame 222. As shown in FIG. 2, the DL/UL switch point 224 in frame 220 of "Cell 1" and the DL/UL switch point 226 in frame 222 of "Cell 2" occur at the same time. Otherwise, the DL transmission of one cell, such as DL 228 of "Cell 1", would affect the UL transmission of another cell, such as UL 230 of "Cell 2."

In designing a new communication system or standard, backward compatibility is critically important. One example is that two or more different systems or different types of signals are transmitted from one or multiple base stations in a communications system. An example of such a scenario is shown in FIG. 3.

FIG. 3 shows an exemplary frame structure 300 for accommodating a legacy system frame structure, as indicated by portions 332 and 334, and a new advanced mode frame structure, as indicated by portions 336 and 338.

As shown in FIG. 3, the frame structure 300 comprises 3 switching points, such as switching points 340, 342, and 344. One approach is to fix one of the switching points, such as switching point 342, across the entire network. The other two switching points, such as switching points 340 and 344, can be configured on a frame by frame basis. In the frame structure 300, with respect to the legacy transmission, the DL transmission indicated by portion 332 is configured so as not to exceed the first switching point, that is, switching point 340, and the UL transmission indicated by portion 334, is configured so as not to begin before the last switching point, that is, switching point 344.

FIG. 4 shows the compatibility of the frame structure 300 described above, with a legacy frame structure 400. As show in FIG. 4, "Cell 1" can be configured to utilize frame structure 300 while "Cell 2" can be configured to utilize legacy frame structure 400. Although the frame structure 300 and the legacy frame structure 400 may coexist in the same network, the abovementioned fixed switching point 342 for the entire network can limit the DL and UL transmission flexibility of the frame structure 300.

FIG. 5 shows a mobile communication system 10 that includes a base station ("BS") 12, a relay station ("RS") 14, and one or more mobile stations ("MS") 16.

As shown in FIG. 5, RS 14 is configured to receive a downlink (DL) transmission 18 from BS 12 and an uplink (UL) transmission 20 from MS 16. As also shown in FIG. 5, RS 14 is configured to encode the received DL transmission 18 and the UL transmission 20 by performing an EXCLUSIVE OR operation on the DL transmission 18 and the UL transmission 20 to generate a singe network-coded DL and UL transmission 22. As further shown in FIG. 5, the RS 14 is configured to broadcast the network-coded DL and UL transmission 22 to the BS 12 and the MS 16.

For example, as illustrated in FIG. 6A, the mobile communication system 30 may include a base station ("BS") 32, a relay station ("RS") 34, a first mobile station ("MS1") 36a having transmission range 38, a second mobile station ("MS2") 36b having a transmission range 40, and a third mobile station ("MS3") 36c having a transmission range 42. As shown in FIG. 6A, each mobile station, such as MS2 36b, maintains a mobile station group ("MSG") comprising any neighboring mobile stations that can be detected by the mobile station via the UL transmissions of the neighboring mobile stations.

For example, the MSG of MS2 36b in FIG. 6A comprises MS1 36a, MS2 36b, and MS3 36c because MS2 36b is within the transmission range 38 of MS1 36a and the transmission range 42 of MS3 36c, and therefore can detect the UL transmissions of MS1 36a and MS3 36c. Each mobile station, such as MS2 36b, periodically reports its MSG to a base station, such as BS 32.

The scheduling of uplink and downlink transmissions by a base station according to an MSG will now be discussed with reference to FIG. 6B. FIG. 6B shows the mobile communication system 30 in FIG. 6A, with MS3 36c omitted in order to simplify the following discussion.

With reference to FIG. 6B, the base station scheduler (not shown in FIG. 6B) of BS 32 pairs a transmission of a DL packet to MS2 36b, such as DL_MS2 44, and a UL packet from MS1 36a, such as UL_MS1 46, in the same frame since MS1 36a is in the MSG of MS2 36b. It should be noted that MS1 36a and MS2 36b can be the same mobile station.

With reference to FIG. 6C, the relay station 34 is configured to receive a transmission of a DL packet to MS2 36b from BS 32 and a transmission of a UL packet from MS1 36a to BS 32 and to encode the DL transmission and the UL transmission to generate a singe network-coded DL and UL transmission 48. As shown in FIG. 6C, the RS 34 is configured to multicast the network-coded DL and UL transmission 48 to the BS 32 and the MS2 36b.

FIG. 7 shows a relay station ("RS"), such as RS 34 in FIGS. 6A through 6C, that provides cooperative relay support by re-encoding the packets in the UL and DL transmissions and transmitting the result of an EXCLSUIVE OR operation of the parity bits, instead of transmitting separate coded physical layer ("PHY") packets. For example, as shown in FIG. 7, an RS decodes the first DL and UL subpackets and re-encodes both the DL and UL subpackets by performing an EXCLUSIVE OR operation on, for example, the second, third, or other subsequent subpacket of the first packet and, for example, the second, third, or other subsequent subpacket of the second packet.

A base station ("BS"), such as BS 32 in FIGS. 6A through 6C, and a mobile station ("MS"), such as MS1 36a in FIGS. 6A through 6C, each use their own parity bits, which are not transmitted, to descramble the received parity bits and to decode the received packets. Therefore, the receiver, which can be the BS or the MS, combines the information from both the source, which can be the BS or the MS, and the RS after descrambling is performed in order to decode the packet, and to thereby reduce bandwidth consumption of the RS.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In one aspect of the invention, a method of providing uplink and downlink transmissions between a mobile terminal and a base station in a mobile communication system is provided. The method includes a relay entity of a first zone of the mobile communication system receiving an uplink transmission from at least one mobile station in the first zone and a downlink transmission from at least one base station in the first zone, the relay entity of the first zone broadcasting first information in the first zone, the first information comprising both the received uplink transmission and received downlink transmission from the first zone, wherein while the relay entity in the at least a first zone is broadcasting the first information, uplink and downlink transmissions are allowed only for good geometry mobile terminals in any communication zone of the mobile communication system in which the corresponding relay entity does not broadcast information.

It is contemplated that a relay entity of a second zone of the mobile communication system receiving an uplink transmission from at least one mobile station in the second zone and a downlink transmission from at least one base station in the second zone and the relay entity of the second zone broadcasting second information in the second zone, the second information comprising both the received uplink transmission and received downlink transmission from the second zone, wherein the broadcast of the second information is synchronized with the broadcast of the first information.

It is contemplated that the relay entity of the first zone broadcasts the first information during a predefined time period.

In another aspect of the invention, a method of transmitting uplink data bursts in a mobile communication system comprising a plurality of mobile terminals, at least a first of the plurality of mobile terminals operating according to a first communications standard and at least a second of the plurality of mobile terminals operating according to a second communications standard is provided. The method includes receiving first information indicating correspondence between the at least a first of the plurality of mobile terminals and information to be transmitted in at least a first uplink data burst and a correspondence between the at least a second of the plurality of mobile terminals and information to be transmitted in at least a second uplink data burst, and transmitting information in the at least first uplink data burst or the at least second uplink data burst according to the first information, wherein the at least first uplink data burst or the at least second uplink data burst comprises only information from the at least a second of the plurality of mobile terminals.

It is contemplated that the at least first uplink data burst comprises information from both the at least a first of the plurality of mobile terminals and the at least a second of the plurality of mobile terminals.

It is contemplated that the at least first uplink data burst is transmitted before the at least second uplink data burst. It is further contemplated that the at least second uplink data burst is transmitted before the at least first uplink data burst. It is still further contemplated that the at least first uplink data burst and the at least second uplink data burst are transmitted during the same time interval.

It is contemplated that the time period during which the at least first uplink data burst and the at least second uplink data burst are transmitted may be utilized by both the at least a first of the plurality of mobile terminals and the at least a second of the plurality of mobile terminals for providing information or making requests to the network.

The method can further include receiving second information identifying at least one point in time at which the at least first uplink data burst or the at least second uplink data burst should be transmitted. It is further contemplated that transmitting information in the at least first uplink data burst or the at least second uplink data burst comprises utilizing the first information to determine a start point of the at least first uplink data burst or the at least second uplink data burst.

In another aspect of the invention, a method of receiving downlink data bursts in a mobile communication system comprising a plurality of mobile terminals, at least a first of the plurality of mobile terminals operating according to a first communications standard and at least a second of the plurality of mobile terminals operating according to a second communications standard is provided. The method includes receiving first information indicating correspondence between the at least a first of the plurality of mobile terminals and information in at least a first downlink data burst and a correspondence between the at least a second of the plurality of mobile terminals and information in at least a second downlink data burst, receiving the at least first downlink data burst and the at least second downlink data burst, processing information in the at least first downlink data burst or the at least second downlink data burst according to the first information, wherein the at least first downlink data burst or the at least second downlink data burst comprises information that only the at least a second of the plurality of mobile terminals can process.

It is contemplated that the at least first downlink data burst comprises information that both the at least a first of the plurality of mobile terminals and the at least a second of the plurality of mobile terminals can process and the at least second downlink data burst comprises information that only the at least a second of the plurality of mobile terminals can process.

The method can further include receiving second information identifying at least one point in time at which the at least first downlink data burst or the at least second downlink data burst should be received.

It is contemplated that processing information in the at least first downlink data burst or the at least second downlink data burst comprises utilizing the first information to determine a start point of the at least first downlink data burst or the at least second downlink data burst. It is further contemplated that the at least first uplink data burst is received before the at least second uplink data burst.

In another aspect of the invention, a method of transmitting uplink data bursts in a mobile communication system comprising a plurality of mobile terminals, at least a first of the plurality of mobile terminals operating according to a first communications standard and at least a second of the plurality of mobile terminals operating according to a second communications standard is provided. The method includes receiving first information indicating correspondence between the at least a first of the plurality of mobile terminals and information to be transmitted in a first uplink data burst, receiving second information indicating correspondence between the at least a second of the plurality of mobile terminals and information to be transmitted in a second uplink data burst, and transmitting information in either the first uplink data burst or the second uplink data burst according to the first information or the second information, where the second uplink data burst comprises only information from the at least a second of the plurality of mobile terminals.

It is contemplated that the first uplink data burst is transmitted before the second uplink data burst. It is further contemplated that the second uplink data burst is transmitted before the first uplink data burst. It is still further contemplated that the first uplink data burst and the second uplink data burst are transmitted during the same time interval.

The method can further include receiving third information identifying at least one point in time at which the first uplink data burst or the second uplink data burst should be transmitted.

It is contemplated that transmitting information in either the first uplink data burst or the second uplink data burst comprises utilizing the first information to determine a start point of at least the first uplink data burst or the second uplink data burst.

It is contemplated that the time period during which the first uplink data burst and the second uplink data burst are transmitted may be utilized by both the at least a first of the plurality of mobile terminals and the at least a second of the plurality of mobile terminals for providing information or making requests to the network.

In another aspect of the invention, a method of receiving downlink data bursts in a mobile communication system comprising a plurality of mobile terminals, at least a first of the plurality of mobile terminals operating according to a first communications standard and at least a second of the plurality of mobile terminals operating according to a second communications standard is provided. The method includes receiving first information indicating correspondence between the at least a first of the plurality of mobile terminals and information in a first downlink data burst, receiving second information indicating correspondence between the at least a second of the plurality of mobile terminals and information in a second downlink data burst, receiving the first downlink data burst and the second data burst, and processing information in either the first downlink data burst or the second downlink data burst according to either the first information or the second information, wherein the second downlink data burst comprises information that only the at least a second of the plurality of mobile terminals can process.

It is contemplated that the first uplink data burst is received before the second uplink data burst.

The method can further include receiving third information identifying at least one point in time at which the first downlink data burst or the second downlink data burst should be received. It is contemplated that processing information in at least the first downlink data burst or the second downlink data burst comprises utilizing the first information to determine a start point of at least the first downlink data burst or the second downlink data burst.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 2 shows an example of synchronization of uplink and downlink switching points in a mobile communication system.

FIG. 7 shows the encoding of packets by a relay for providing cooperative relay support.

DETAILED DESCRIPTION OF THE PREFERRED EMBODIMENTS

The present invention relates to an apparatus and method for an enhanced Time Division Duplex ("TDD") frame structure capable of supporting both legacy and advanced frame structures, while providing increased downlink ("DL") and uplink ("UL") transmission flexibility. Reference will now be made in detail to the preferred embodiments of the present invention, examples of which are illustrated in the accompanying drawings.

Figure 1:
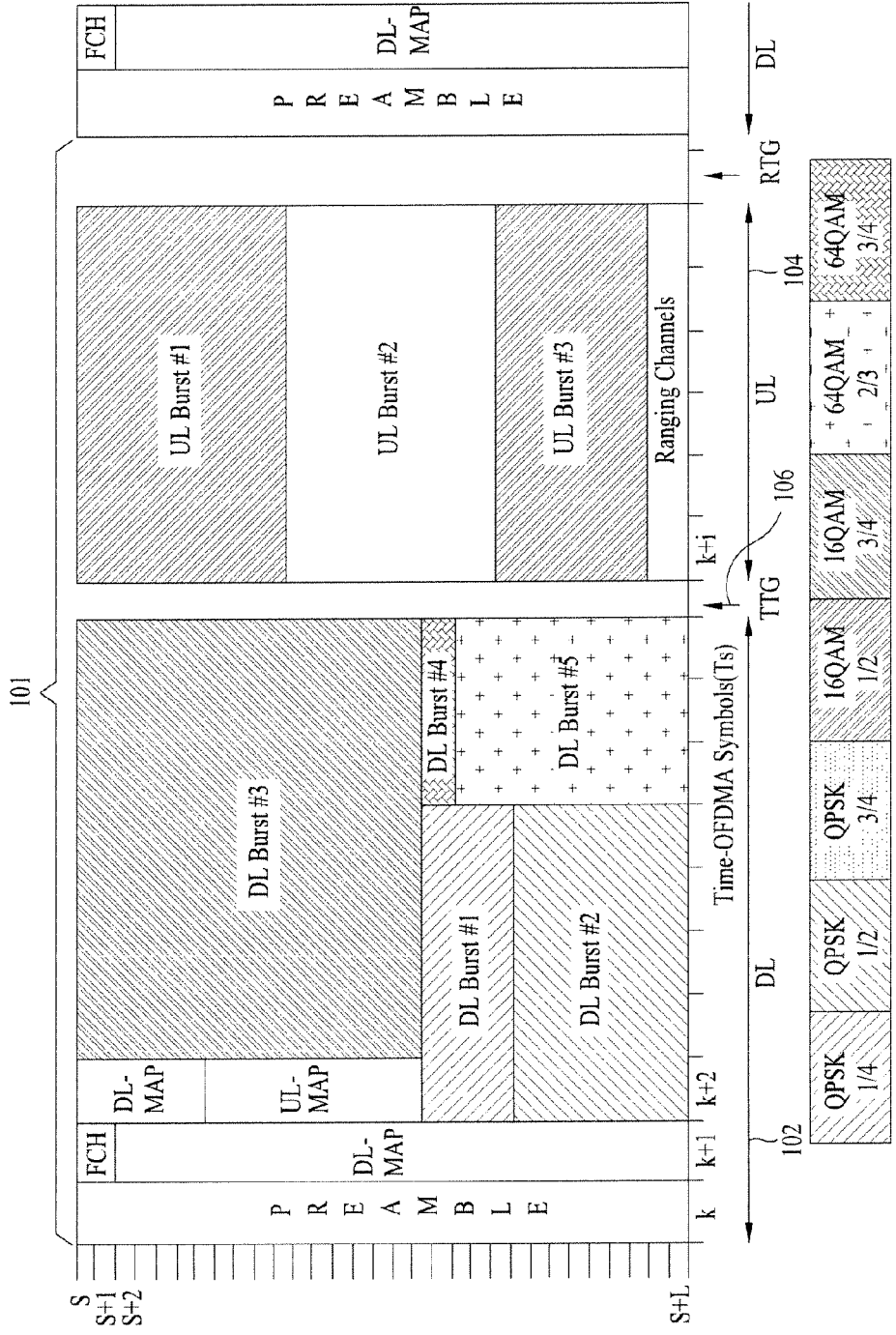
FIG. 1 shows an example of a Time Division Duplex ("TDD") transmission frame structure for mobile Worldwide Interoperability for Microwave Access (WiMAX) IEEE 802.16e.
Figure 3:
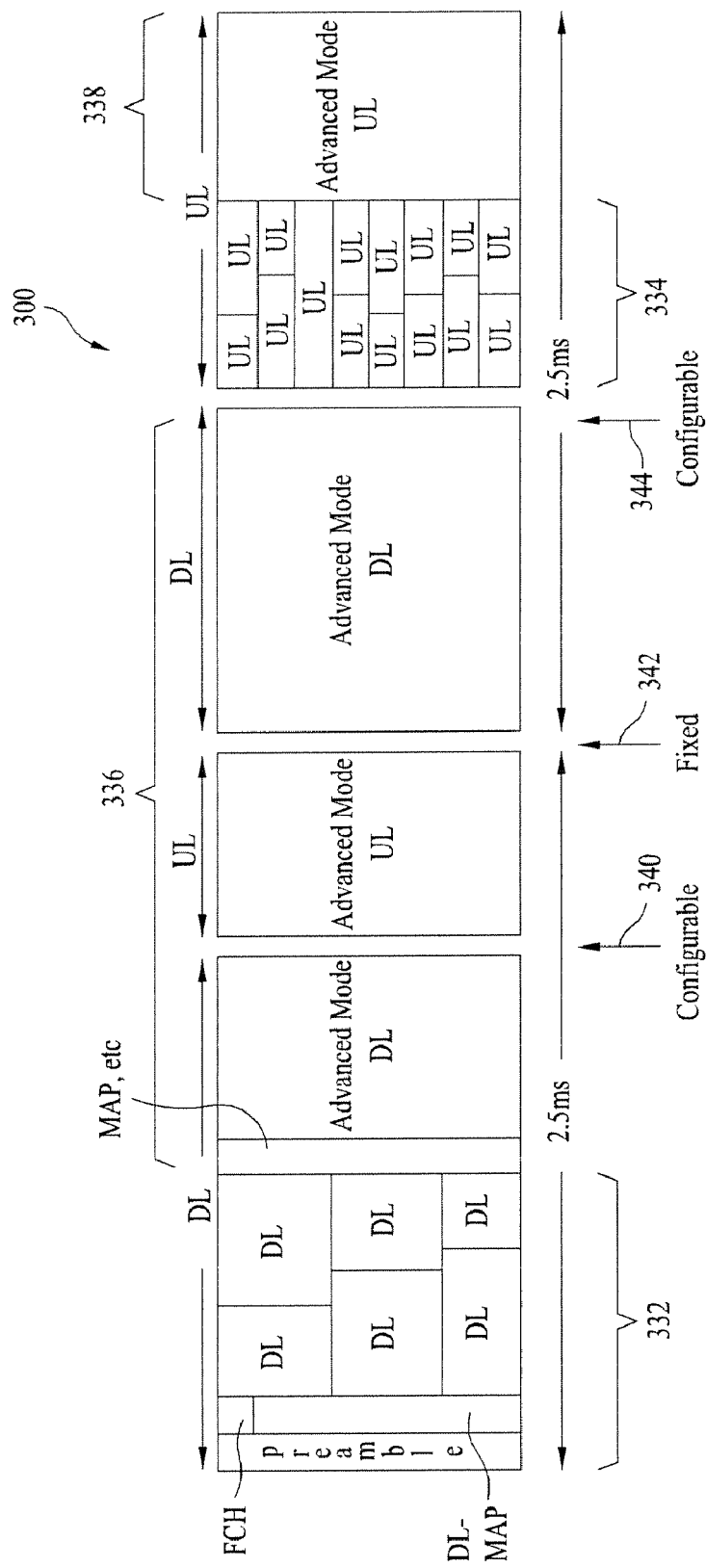
FIG. 3 shows a frame structure for accommodating a legacy system frame structure and a new advanced mode frame structure.
Figure 4:
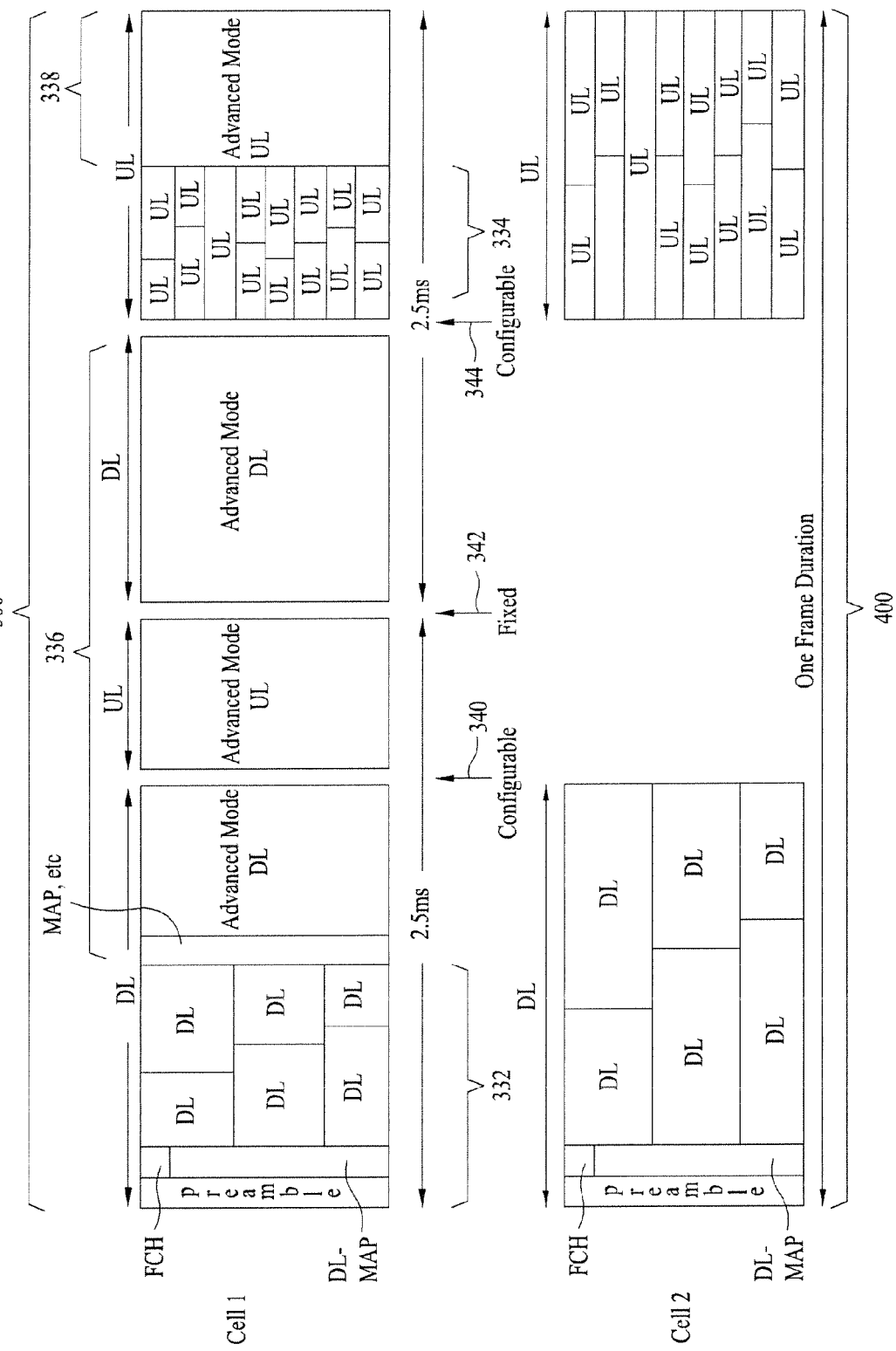
FIG. 4 shows the compatibility of the frame structure in FIG. 3 with a legacy frame structure.
Figure 5:
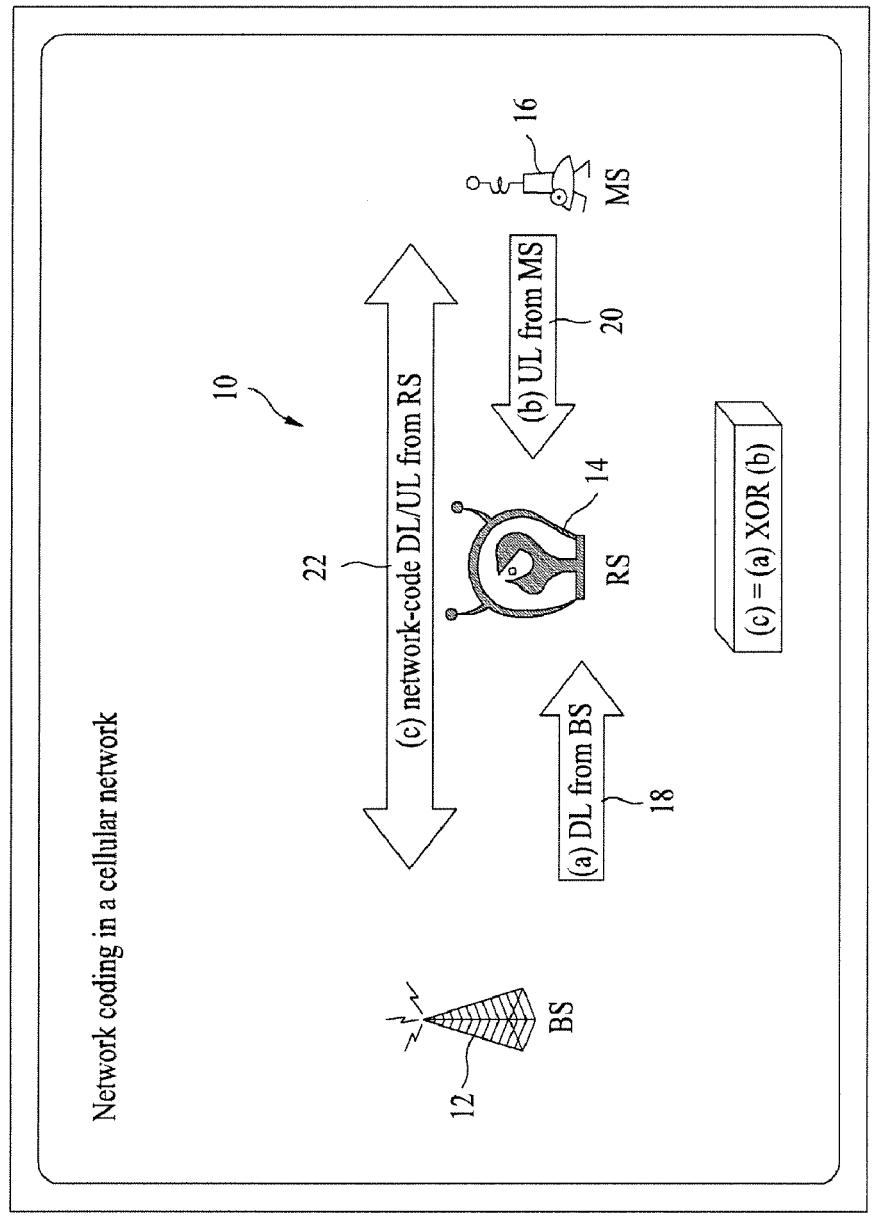
FIG. 5 shows an example of network coding in a mobile communication system.
Figure 6A:
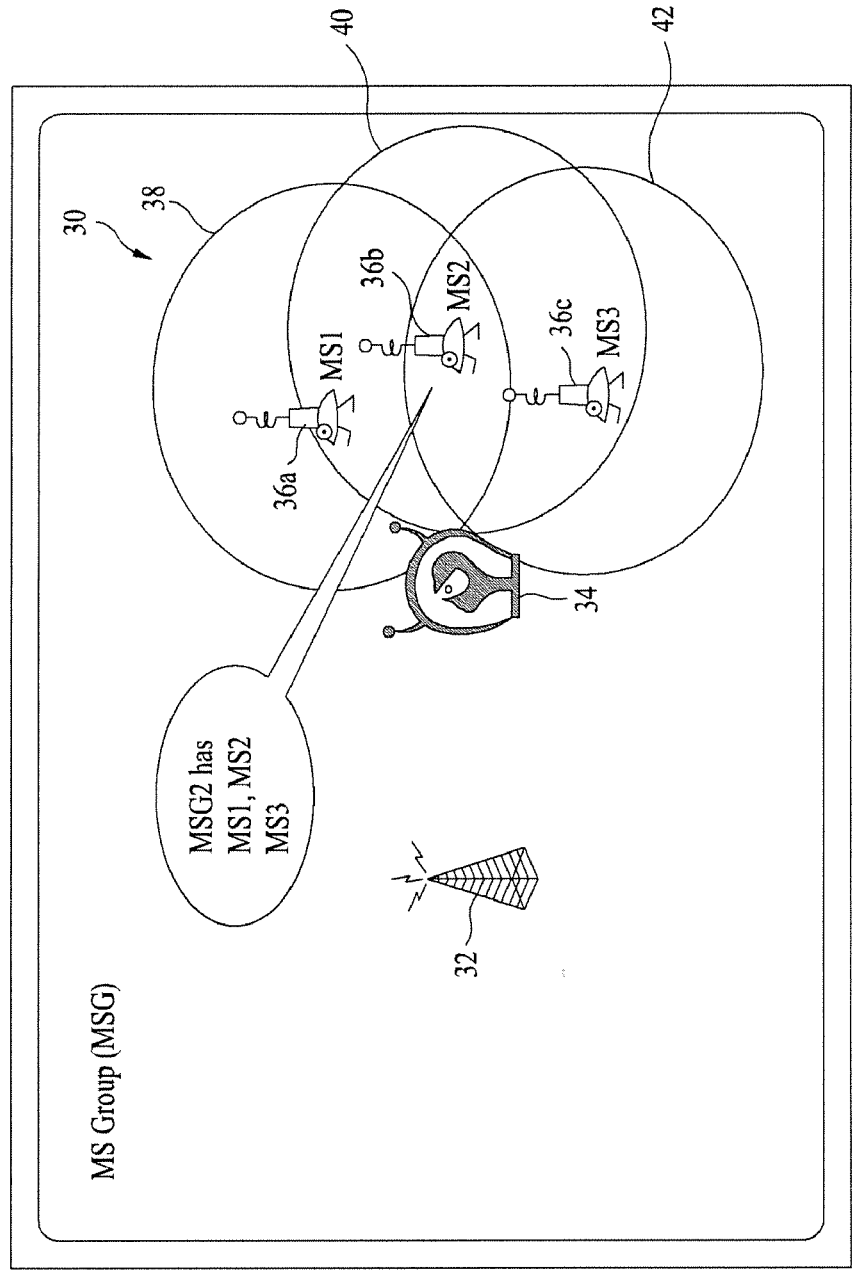
FIG. 6A shows a mobile communication system comprising a mobile station group.
Figure 6B:
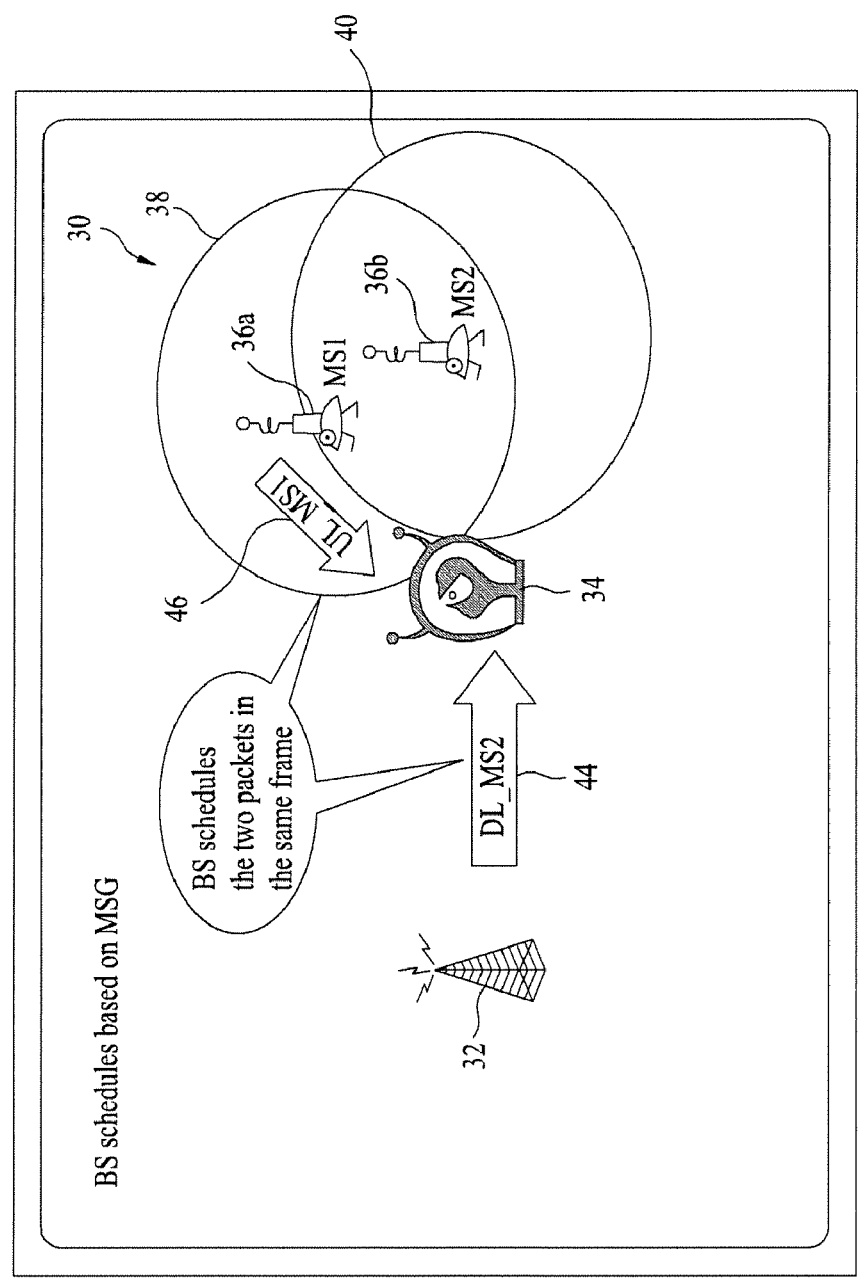
FIG. 6B shows a mobile communication system showing the scheduling of packets by a base station based on a mobile station group.
Figure 6C:
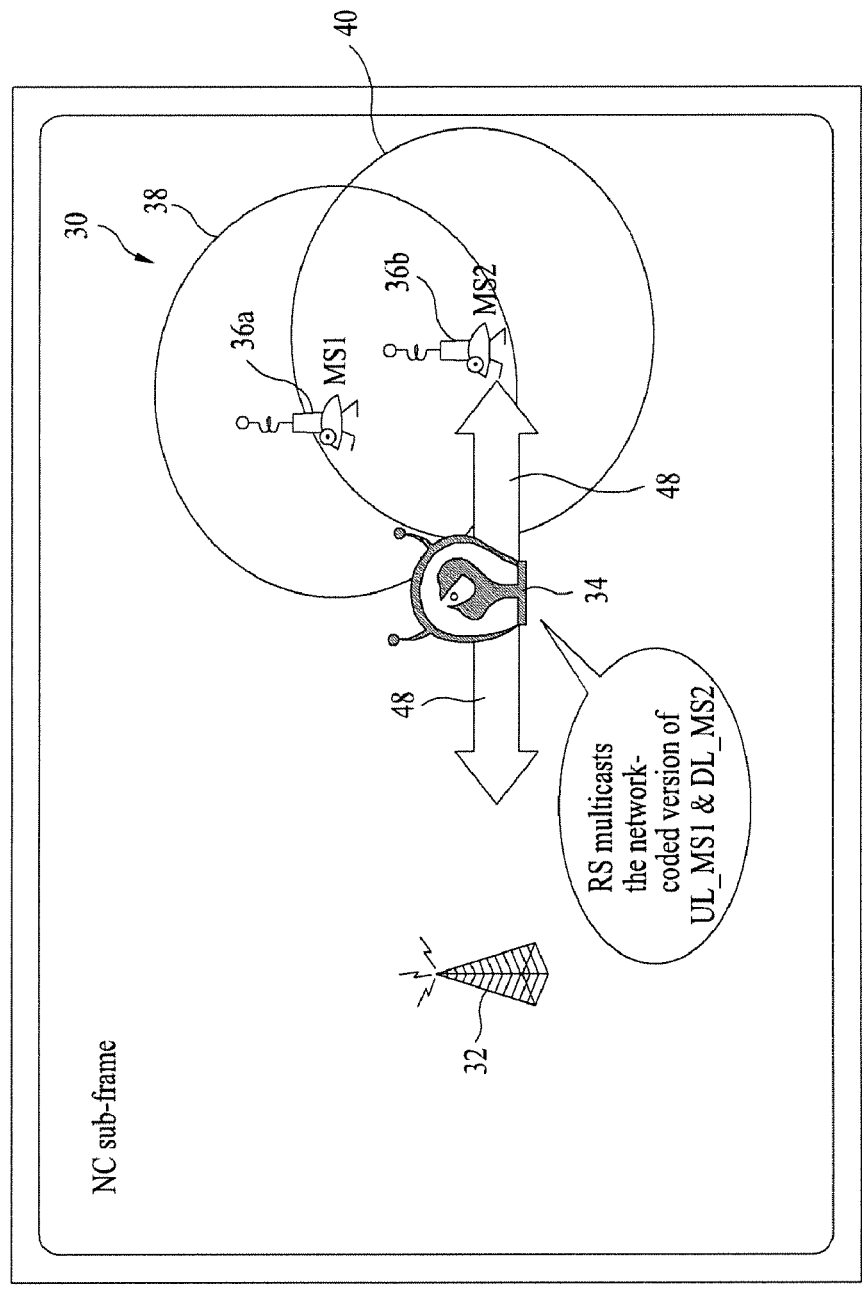
FIG. 6C shows a mobile communication system comprising a relay station multicasting a network-coded sub-frame.
Figure 8:
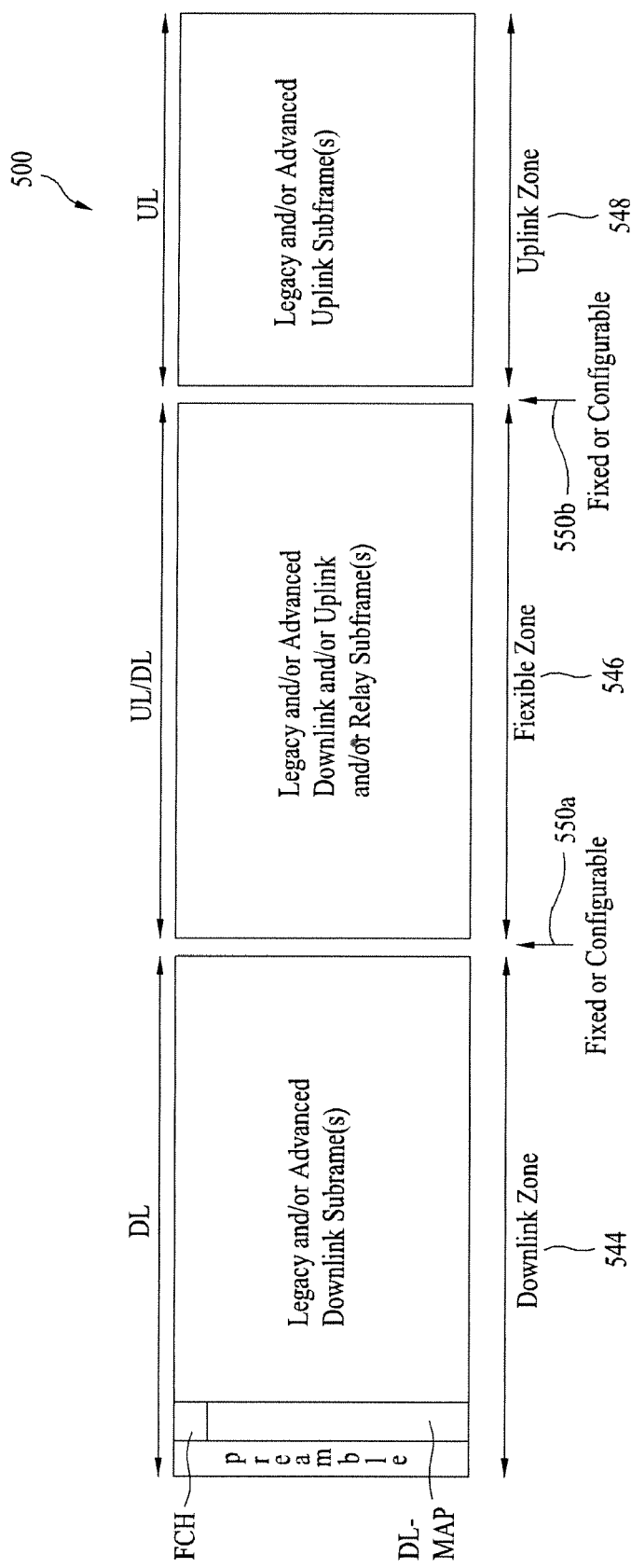
FIG. 8 shows a frame structure pattern in accordance with one embodiment of the present invention.

FIG. 8 shows a frame structure pattern 500 in accordance with one embodiment of the present invention. As shown in FIG. 8, frame structure 500 comprises downlink zone 544, flexible zone 546, and uplink zone 548.

The downlink zone 544 is typically used for transmitting data or additional control/signaling information from a base station to one or more mobile stations. The downlink zone 544 can be configured to include a legacy downlink subframe or a burst transmission, a legacy broadcast/multicast subframe or a burst transmission, a new/advanced downlink subframe or a burst transmission, and/or a new/advanced broadcast/multicast subframe or burst transmission. Where the numerology for the advanced subframe is compatible with the numerology of the legacy subframe, the advanced subframe and the legacy subframe can be mixed in the frequency domain or can utilize the same symbols. For example, a legacy transmission and an advanced signal transmission can share the same Orthogonal Frequency Division Multiplexing ("OFDM") symbols.

The uplink zone 548 is typically used for transmitting data or additional control/signaling information from one or more mobile stations to a single base station. The uplink zone 548 can be configured to include a mix of a legacy uplink subframe or burst and an advanced uplink subframe or burst. Where the numerology for the advanced subframe is compatible with the legacy subframe, the advanced uplink burst and the legacy uplink burst can share the same symbols, such as the same OFDM symbols.

The flexible zone 546 can be configured to transmit any possible downlink or uplink subframe or bursts. As shown in FIG. 8, the flexible zone 546 is defined between two switching points, such as switching points 550a and 550b. In one embodiment, switching points 550a and 550b can be configured with respect to an entire network. In another embodiment, switching points 550a and 550b can be configured on a frame by frame basis or based on multiple frames. Due to the flexibility of the transmissions inside the flexible zone 546, co-channel interference may occur between neighbor cells. However, with proper network planning and appropriate configuration of the switching points 550a and 550b, a balance can be achieved between interference and flexibility.

Figure 9:
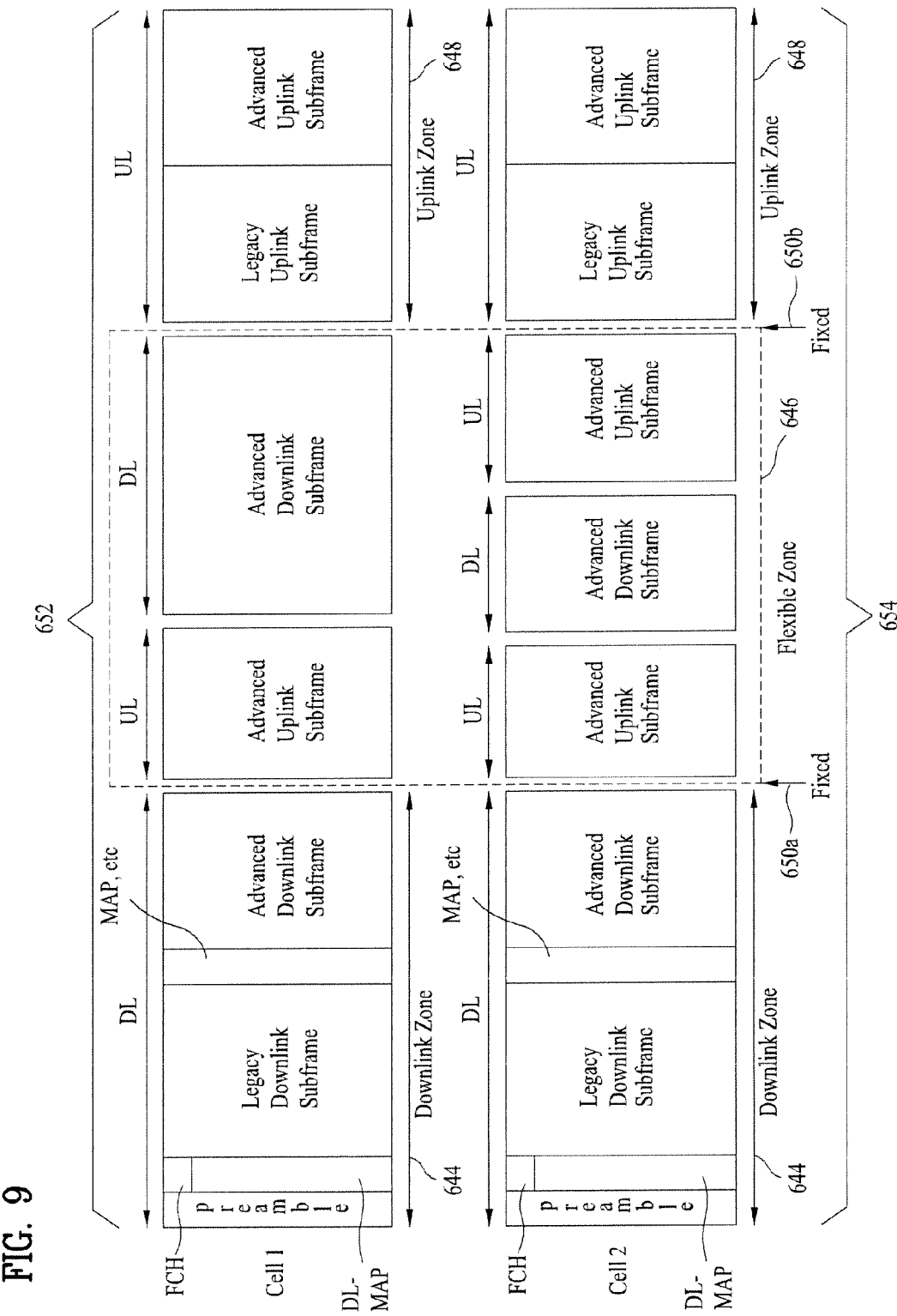
FIG. 9 shows an exemplary implementation of a frame structure in accordance with one embodiment of the present invention.

FIG. 9 shows an exemplary implementation of the frame structure 500 in FIG. 8 in accordance with one embodiment of the present invention.

As shown in FIG. 9, "Cell 1" of a mobile communication network can be configured to use the frame structure 652 and "Cell 2" can be configured to use the frame structure 654. As further shown in FIG. 9, the first switching point 650a located between the flexible zone 646 and the downlink zone 644 and the second switching point 650b located between the flexible zone 646 and the uplink zone 648 are fixed with respect to frame structures 652 and 654.

As also shown in FIG. 9, the frame structures 652 and 654 allow flexible transmissions within flexible zone 646. For example, the frame structure 652 of "Cell 1" can comprise a different configuration of uplink and downlink subframes within flexible zone 646 than frame structure 654 of "Cell 2." As another example, the switching points in the flexible zone 646 in the frame structure 652 of "Cell 1" can be different than the switching points in the flexible zone 646 in the frame structure 654 of "Cell 2."

Figure 10:
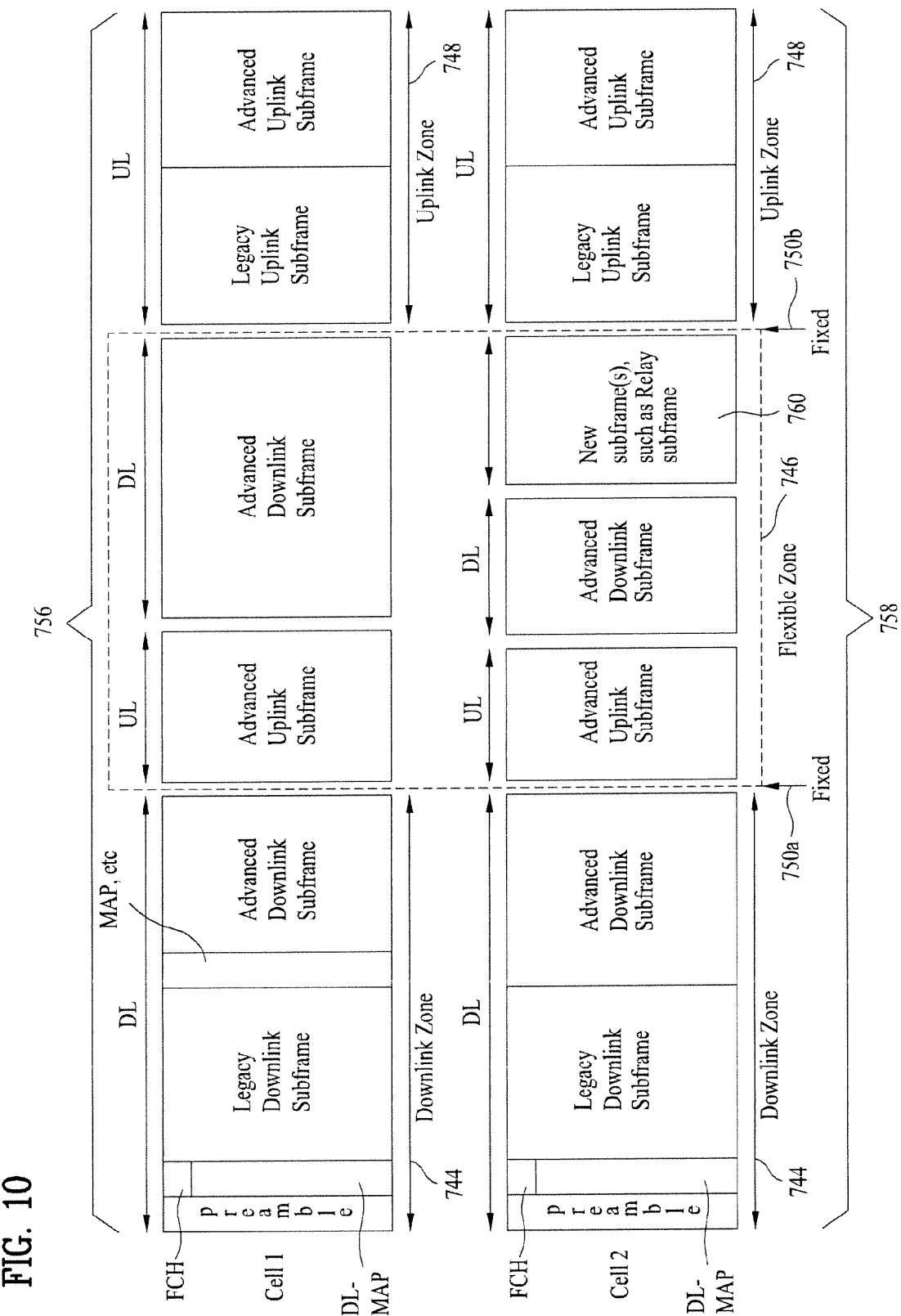
FIG. 10 shows an exemplary implementation of a frame structure in accordance with one embodiment of the present invention.

FIG. 10 shows an exemplary implementation of the frame structure 500 in FIG. 8 in accordance with one embodiment of the present invention.

As shown in FIG. 10, "Cell 1" of a mobile communication network can be configured to use the frame structure 756 and "Cell 2" can be configured to use the frame structure 758. As further shown in FIG. 10, the first switching point 750a located between the flexible zone 746 and the downlink zone 744 and the second switching point 750b located between the flexible zone 746 and the uplink zone 748 are fixed with respect to the frame structures 756 and 758.

As also shown in FIG. 10, the frame structures 756 and 758 allow flexible transmissions within the flexible zone 746. For example, the frame structure 758 of "Cell 2" can comprise a different configuration of the uplink and downlink subframes within the flexible zone 746, including one or more new subframes, such as the relay subframe 760, than the frame structure 756 of "Cell 1." As another example, the switching points in the flexible zone 746 in the frame structure 756 of "Cell 1" can be different than the switching points in the flexible zone 746 in the frame structure 758 of "Cell 2."

Figure 11:
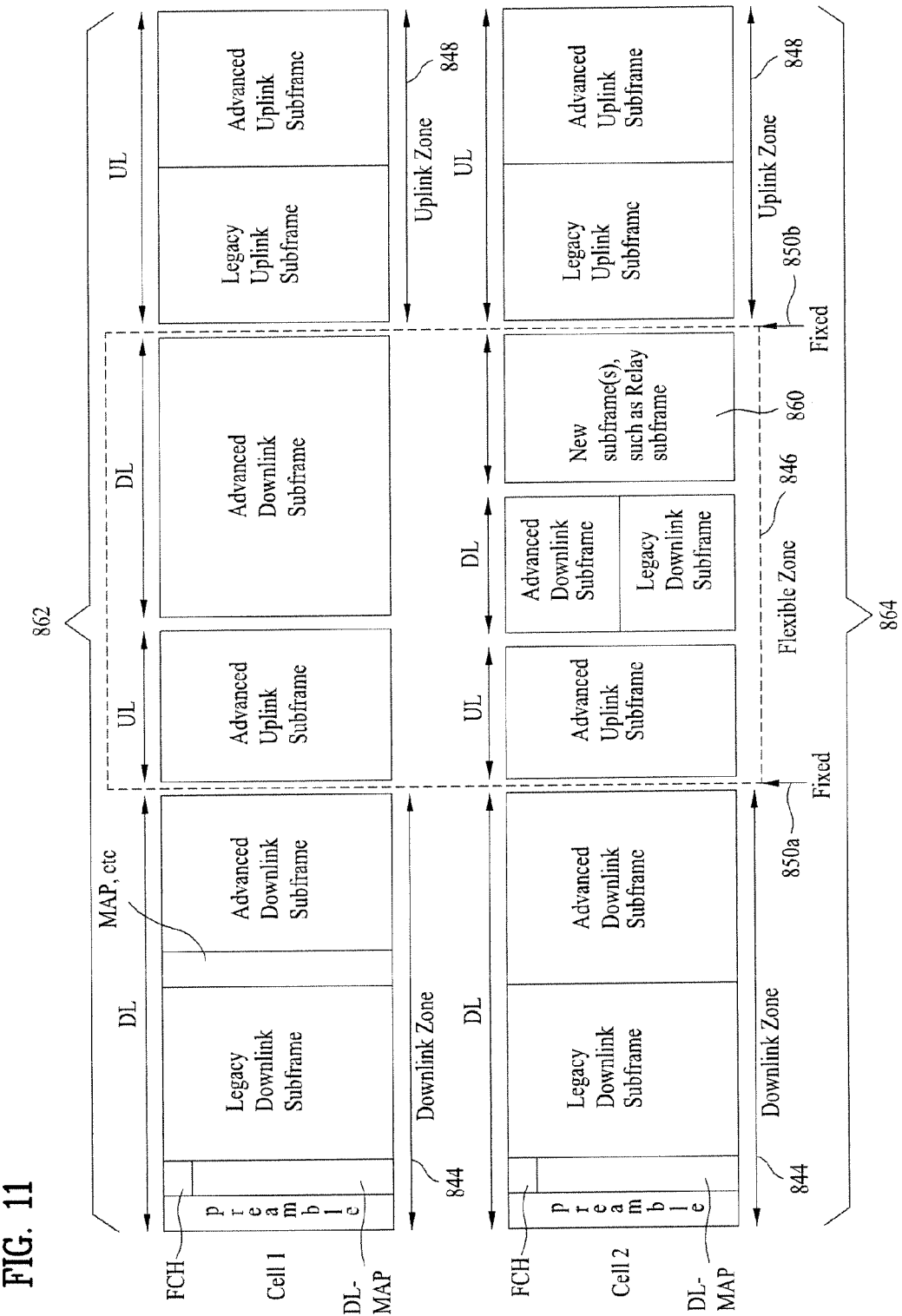
FIG. 11 shows an exemplary implementation of a frame structure in accordance with one embodiment of the present invention.

FIG. 11 shows an exemplary implementation of the frame structure 500 in FIG. 8 in accordance with one embodiment of the present invention.

As shown in FIG. 11, "Cell 1" of a mobile communication network can be configured to use the frame structure 862 and "Cell 2" can be configured to use the frame structure 864. As further shown in FIG. 11, the first switching point 850*a* located between the flexible zone 846 and downlink zone 844 and the second switching point 850*b* located between the flexible zone 846 and the uplink zone 848 are fixed with respect to the frame structures 862 and 864.

As also shown in FIG. 11, the frame structures 862 and 864 allow flexible transmissions within the flexible zone 846. For example, the frame structure 864 of "Cell 2" can comprise a different configuration of uplink and downlink subframes within the flexible zone 846, including one or more new subframes, such as the relay subframe 860, than the frame structure 862 of "Cell 1." For another example, "Cell 2" can be configured to utilize compatible numerologies between the legacy system and the new system within the flexible zone 846. For still another example, the switching points in the flexible zone 846 in the frame structure 862 of "Cell 1" can be different than the switching points in the flexible zone 846 in the frame structure 864 of "Cell 2."

Figure 12:
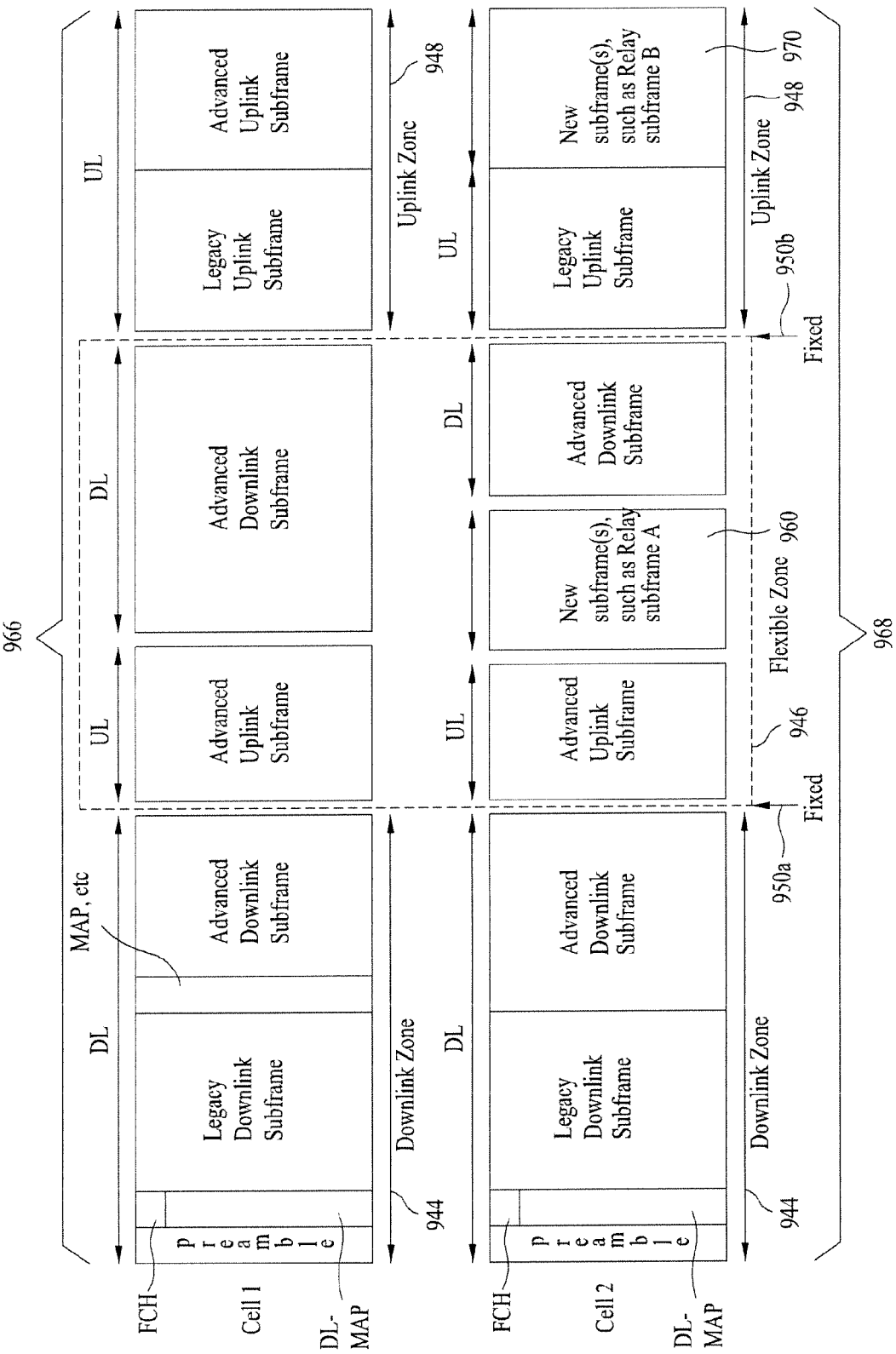
FIG. 12 shows an exemplary implementation of a frame structure in accordance with one embodiment of the present invention.

FIG. 12 shows an exemplary implementation of the frame structure 500 in FIG. 8 in accordance with one embodiment of the present invention.

As shown in FIG. 12, "Cell 1" of a mobile communication network can be configured to use the frame structure 966 and "Cell 2" can be configured to use the frame structure 968. As further shown in FIG. 12, the first switching point 950*a* located between the flexible zone 946 and the downlink zone 944 and the second switching point 950*b* located between the flexible zone 946 and the uplink zone 948 are fixed with respect to the frame structures 966 and 968.

As also shown in FIG. 12, the frame structures 966 and 968 allow flexible transmissions within the flexible zone 946. For example, the frame structure 968 of "Cell 2" can comprise a different configuration of uplink and downlink subframes within the flexible zone 946, including one or more new subframes, such as the relay subframe A 960, than the frame structure 966 of "Cell 1." As another example, the switching points in the flexible zone 946 in the frame structure 966 of "Cell 1" can be different than the switching points in the flexible zone 946 in the frame structure 968 of "Cell 2." In the embodiment of FIG. 12, "Cell 2" can be configured to transmit one or more new subframes in uplink zone 948, such as the relay subframe B 970.

Figure 13:
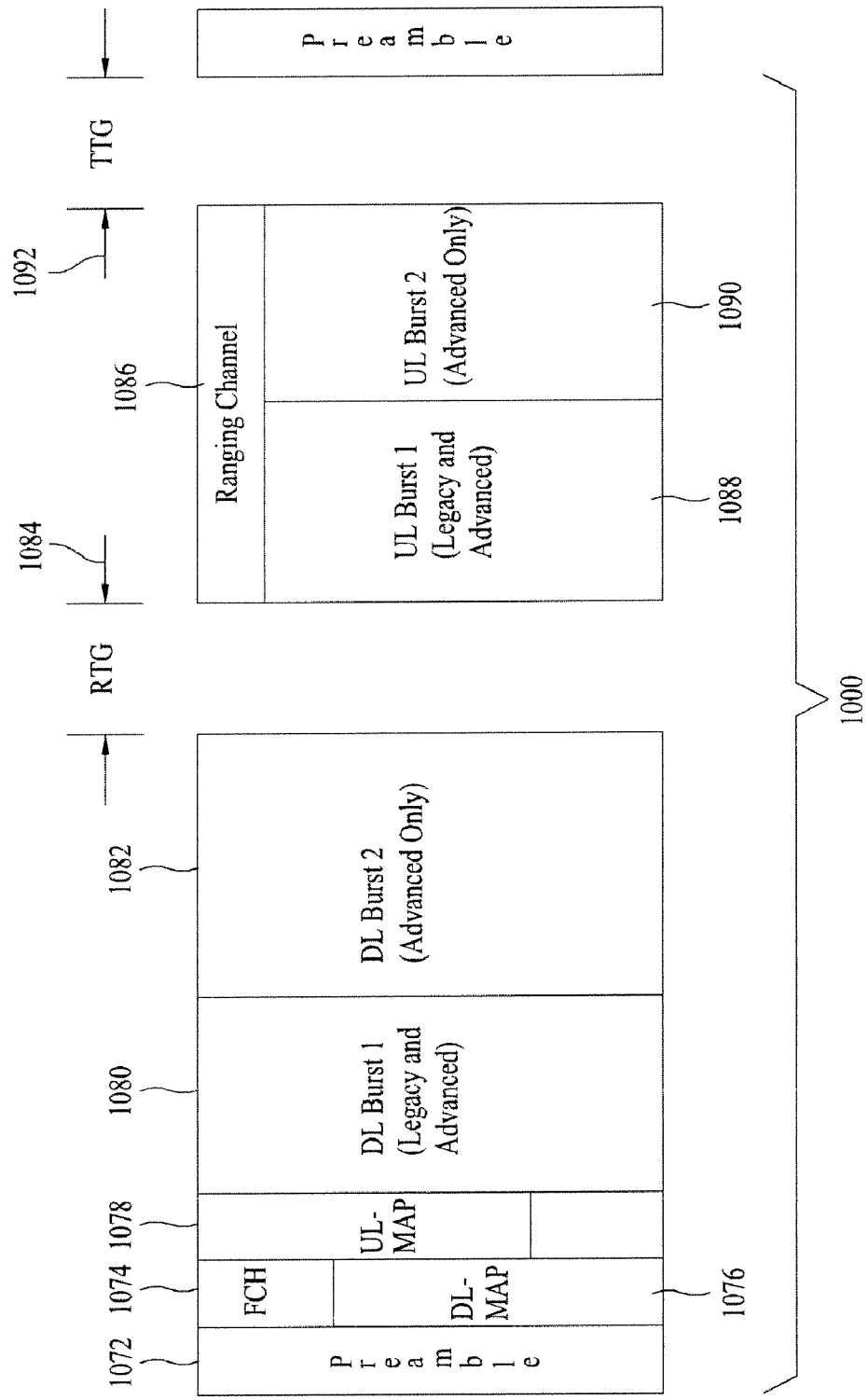
FIG. 13 shows a frame structure supporting legacy and new transmissions in accordance with one embodiment of the present invention.

FIG. 13 shows a frame structure 1000 supporting legacy and new transmissions in accordance with one embodiment of the present invention.

Frame structure 1000 includes a preamble 1072, a frame control header ("FCH") 1074, a downlink MAP message ("DL-MAP") 1076, an uplink MAP message ("UL-MAP") 1078, a downlink burst 1 ("DL Burst 1") 1080, a downlink burst 2 ("DL Burst 2") 1082, a receive/transmit transmission gap ("RTG") 1084, a ranging channel 1086, an uplink burst 1 ("UL Burst 1") 1088, an uplink burst 2 ("UL Burst 2") 1090, and a transmit/receive transmission gap ("TTG") 1092.

As shown in FIG. 13, frame structure 1000 maintains the same number of switching points, that is, one RTG and one TTG, as the frame structure of the IEEE 802.16e standard. The frame structure 1000 shown in FIG. 13 supports the same or different numerologies for legacy and new transmissions. In one embodiment, legacy systems and new systems may use the same numerologies.

In the frame structure 1000, new mobile stations can be assigned to DL Burst 1 1080, DL Burst 2 1082, UL Burst 1 1088, and UL Burst 2 1090, whereas legacy mobile stations can be assigned to DL Burst 1 1080 and UL Burst 1 1088. It should be understood that the DL Burst 2 1082 and the UL Burst 2 1090 are transparent to legacy mobile stations. In one embodiment, the locations of the DL Burst 1 1080 and the DL Burst 2 1082 in frame structure 1000 can be switched. As shown in FIG. 13, the UL Burst 1 1088 and the UL Burst 2 1090 can each have a ranging channel, such as ranging channel 1086.

The times at which the DL Burst 2 1082 and the UL Burst 2 1090 begin can be adjusted depending on various factors, such as the number of legacy and new mobile stations involved, and the amount of network traffic. In order to support the DL Burst 1 1080, DL Burst 2 1082, UL Burst 1 1088, and UL Burst 2 1090, the DL-MAP 1076 and the UL-MAP 1078 are appropriately modified.

In the frame structure 1000, a new mobile transmission in the DL Burst 1 1080 can be acknowledged in either the UL Burst 1 1088 or the UL Burst 2 1090. For example, a delay sensitive transmission from a new mobile in the DL Burst 1 1080 can be acknowledged in the UL Burst 1 1088. As another example, a delay tolerant transmission from a new mobile station in the DL Burst 1 1080 can be acknowledged in either the UL Burst 2 1090 or in the UL Burst 1 or the UL Burst 2 in a subsequent super-frame (not shown in FIG. 13).

In the frame structure 1000, a new mobile transmission in the DL Burst 2 1082 can be acknowledged in either the UL Burst 2 1090, or the UL Burst 1 or the UL Burst 2 in a subsequent super-frame (not shown in FIG. 13). The legacy mobile transmission in DL Burst 1 1080 can be acknowledged in either the UL Burst 1 1088 or in the UL Burst 1 in a subsequent super frame.

Figure 14:
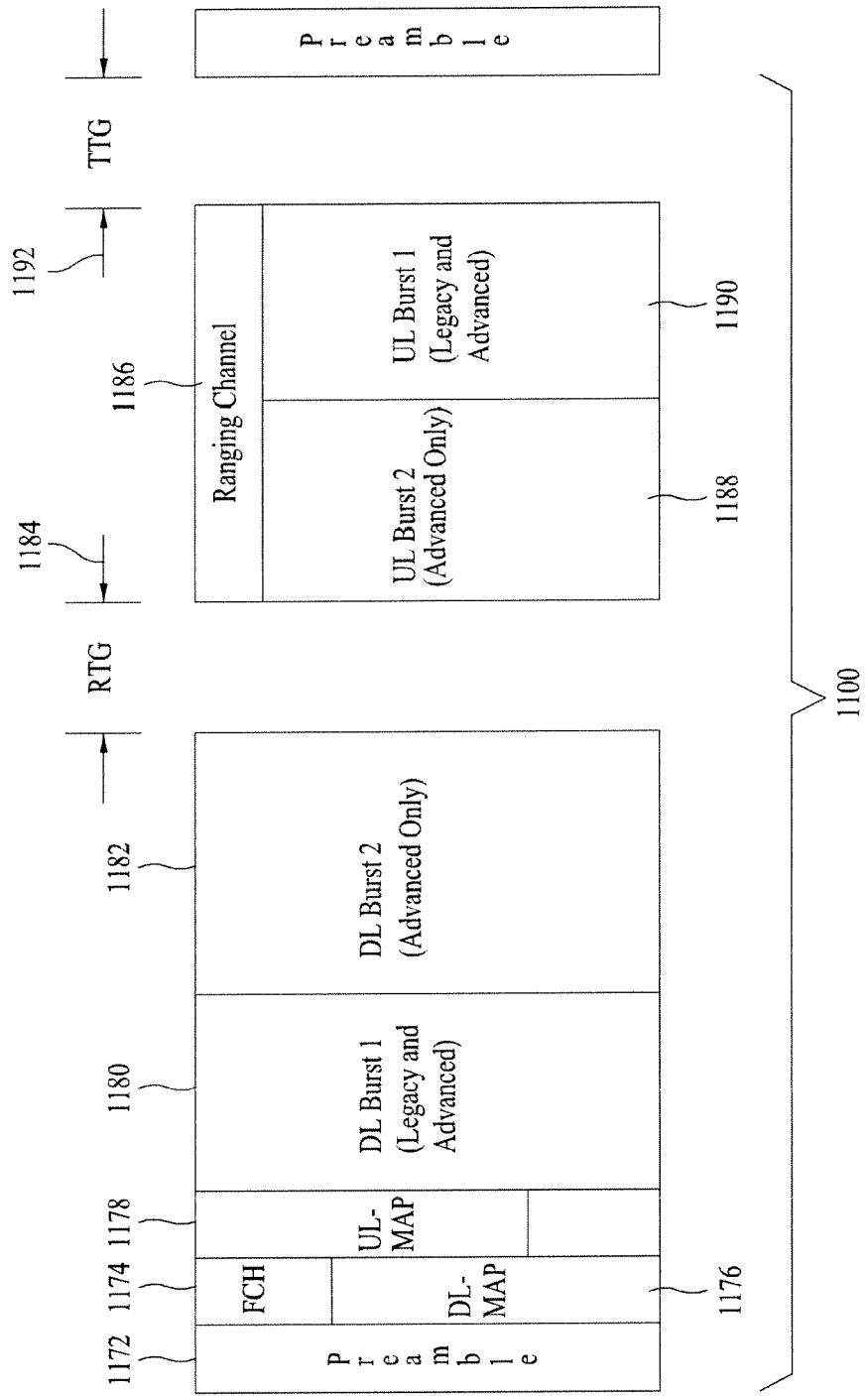
FIG. 14 shows a frame structure supporting legacy and new transmissions in accordance with one embodiment of the present invention.

FIG. 14 shows a frame structure supporting legacy and new transmissions in accordance with one embodiment of the present invention.

Frame structure 1100 in FIG. 14 comprises a preamble 1172, a frame control header ("FCH") 1174, a DL-MAP 1176, a UL-MAP 1178, a DL Burst 1 1180, a DL Burst 2 1182, an RTG 1184, a ranging channel 1186, a UL Burst 1 1190, a UL Burst 2 1188, and a TTG 1192.

As shown in FIG. 14, frame structure 1100 maintains the same number of switching points, that is, one RTG and one TTG, as the frame structure of the IEEE 802.16e standard. The frame structure 1100 shown in FIG. 14 supports the same or different numerologies for legacy and new transmissions. In one embodiment, legacy systems and new systems may use the same numerologies.

In the frame structure 1100, new mobile stations can be assigned to the DL Burst 1 1180, DL Burst 2 1182, UL Burst 1 1190, and UL Burst 2 1188, whereas legacy mobile stations can be assigned to the DL Burst 1 1180 and UL Burst 1 1190. It should be understood that the DL Burst 2 1182 and the UL Burst 2 1188 are transparent to legacy mobile stations. As shown in FIG. 14, the UL Burst 1 1190 and UL Burst 2 1188 can each have a ranging channel, such as ranging channel 1186. In one embodiment, the positions of the DL Burst 1 1180 and the DL Burst 2 1182 in the frame structure 1100 can be switched with one another.

The time at which the DL Burst 2 1182 begins and the time at which the UL Burst 2 1188 ends can be adjusted depending on various factors, such as the number of legacy and new mobile stations involved, and the amount of network traffic. In order to support the DL Burst 1 1180, DL Burst 2 1182, UL Burst 1 1190, and UL Burst 2 1188, the DL-MAP 1176 and the UL-MAP 1178 are appropriately modified.

In the frame structure 1100, a new mobile transmission in the DL Burst 1 1180 can be acknowledged in either the UL Burst 1 1190 or the UL Burst 2 1188. In the frame structure 1100, a new mobile transmission in the DL Burst 2 1182 can be acknowledged in either the UL Burst 1 1190, or the UL Burst 1 or the UL Burst 2 in a subsequent super-frame (not shown in FIG. 14). The legacy mobile transmission in the DL Burst 1 1180 can be acknowledged in either the UL Burst 1 1190 or in the UL Burst 1 in the subsequent super frame.

Figure 15:
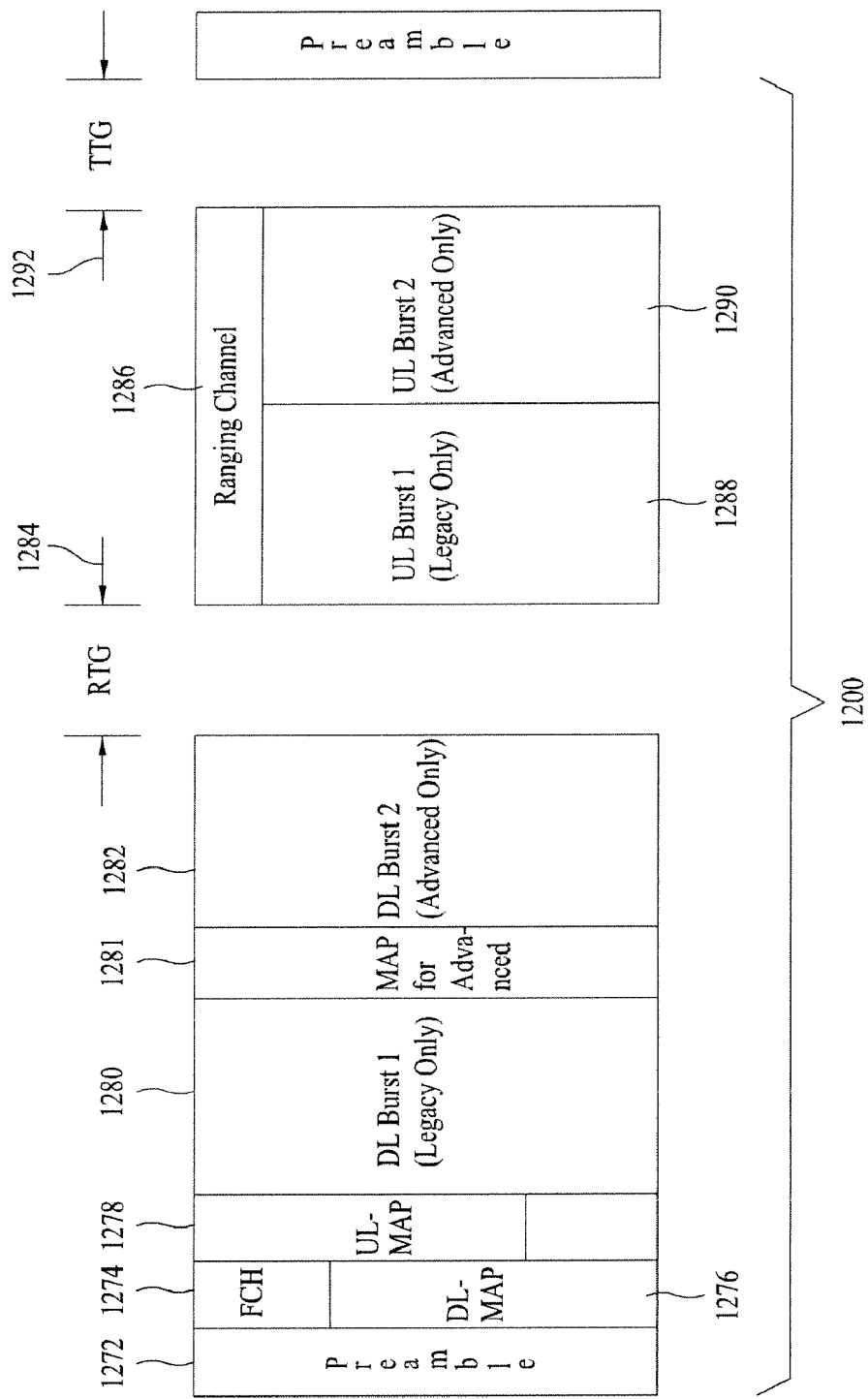
FIG. 15 shows a frame structure supporting legacy and new transmissions in accordance with one embodiment of the present invention.

FIG. 15 shows a frame structure supporting legacy and new transmissions in accordance with one embodiment of the present invention.

Frame structure 1200 includes a preamble 1272, an FCH 1274, a DL-MAP 1276, a UL-MAP 1278, a DL Burst 1 1280, new uplink and downlink MAP messages (MAP for Advanced) 1281, a DL Burst 2 1282, an RTG 1284, a ranging channel 1286, a UL Burst 1 1288, a UL Burst 2 1290, and a TTG 1292.

As shown in FIG. 15, frame structure 1200 maintains the same number of switching points, that is, one RTG and one TTG, as the frame structure of the IEEE 802.16e standard. The frame structure 1200 shown in FIG. 15 supports the same or different numerologies for legacy and new transmissions. In one embodiment, legacy systems and new systems may use the same numerologies.

In the frame structure 1200, new mobile stations can be assigned to the DL Burst 2 1282 and the UL Burst 2 1290, whereas legacy mobile stations can be assigned to the DL Burst 1 1280 and the UL Burst 1 1288. It should be understood that the DL Burst 2 1282 and the UL Burst 2 1290 are transparent to legacy mobile stations. As shown in FIG. 15, the UL Burst 1 1288 and the UL Burst 2 1290 can each have a ranging channel, such as ranging channel 1286.

In the frame structure 1200, legacy transmissions in the DL Burst 1 1280 and the UL Burst 1 1288 are supported by the legacy DL-MAP 1276 and UL-MAP 1278, and new transmissions in the DL Burst 2 1282 and the UL Burst 2 1290 are supported by the MAP for Advanced 1281. The times at which the MAP for Advanced 1281 and the UL Burst 2 1290 begin can be adjusted depending on various factors, such as the number of legacy and new mobile stations involved, and the amount of network traffic.

In the frame structure 1200, a new mobile transmission in the DL Burst 2 1282 can be acknowledged in either the UL Burst 2 1290 or the UL Burst 2 in a subsequent super-frame (not shown in FIG. 15). In the frame structure 1200, the legacy mobile transmission in the DL Burst 1 1280 can be acknowledged in either the UL Burst 1 1288 or in the UL Burst 1 in the subsequent super frame.

Figure 16:
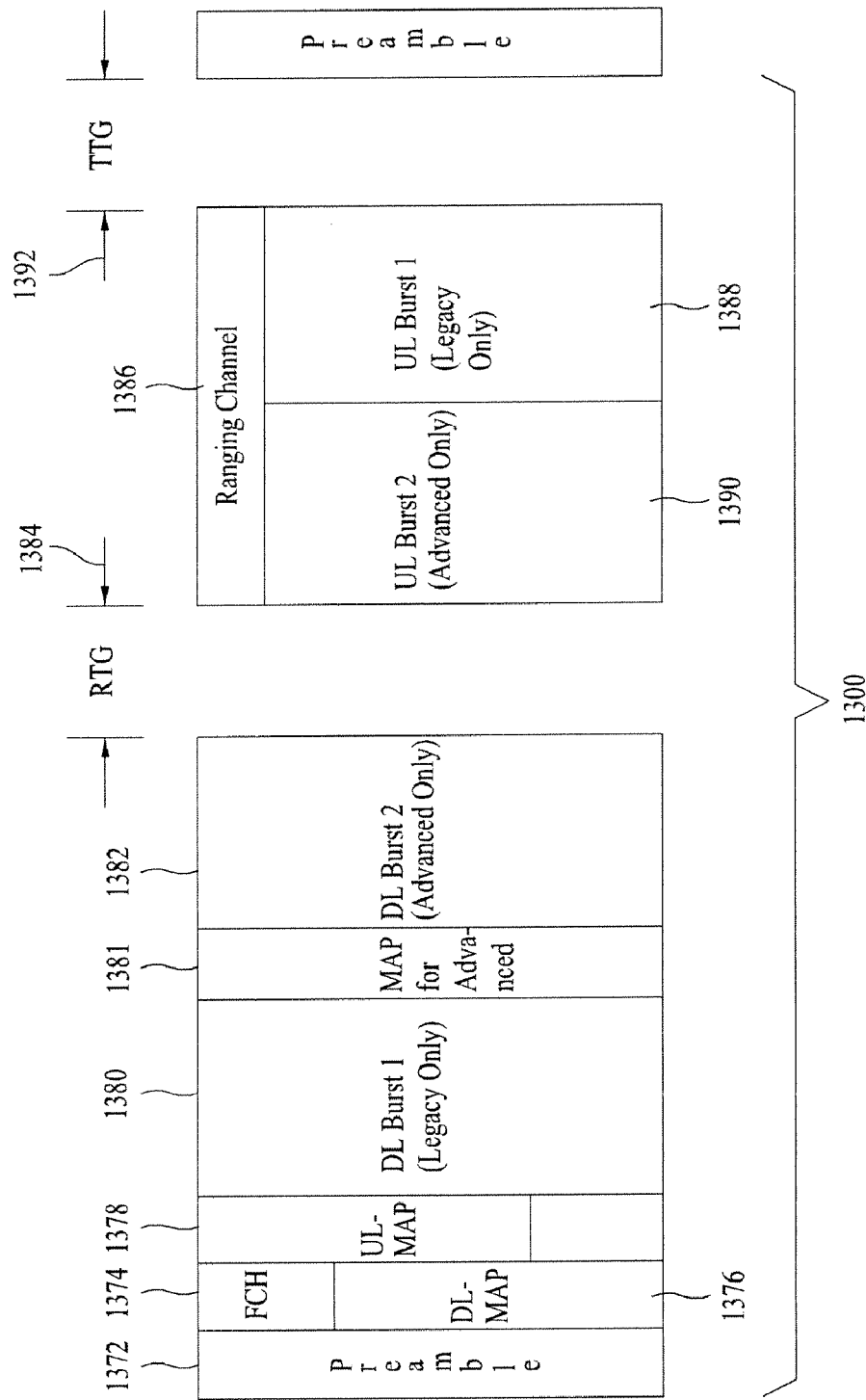
FIG. 16 shows a frame structure supporting legacy and new transmissions in accordance with one embodiment of the present invention.

FIG. 16 shows a frame structure supporting legacy and new transmissions in accordance with one embodiment of the present invention.

Frame structure 1300 includes a preamble 1372, an FCH 1374, a DL-MAP 1376, a UL-MAP 1378, a DL Burst 1 1380, new uplink and downlink MAP messages (MAP for Advanced) 1381, a DL Burst 2 1382, an RTG 1384, a ranging channel 1386, a UL Burst 1 1388, a UL Burst 2 1390, and a TTG 1392.

As shown in FIG. 16, frame structure 1300 maintains the same number of switching points, that is, one RTG and one TTG, as the frame structure of the IEEE 802.16e standard. The frame structure 1300 shown in FIG. 16 supports the same or different numerologies for legacy and new transmissions. In one embodiment, legacy systems and new systems may use the same numerologies.

In the frame structure 1300, new mobile stations, such as mobiles communicating at high speeds, can be assigned to the DL Burst 2 1382 and the UL Burst 2 1390, whereas legacy mobile stations can be assigned to the DL Burst 1 1380 and the UL Burst 1 1388. It should be understood that the DL Burst 2 1382 and the UL Burst 2 1390 are transparent to legacy mobile stations. As shown in FIG. 16, the UL Burst 1 1388 and the UL Burst 2 1390 can each have a ranging channel, such as ranging channel 1386.

In the frame structure 1300, legacy transmissions in the DL Burst 1 1380 and the UL Burst 1 1388 are supported by the legacy DL-MAP 1376 and UL-MAP 1378, and new transmissions in the DL Burst 2 1382 and the UL Burst 2 1390 are supported by the MAP for Advanced 1381. The time at which the MAP for Advanced 1381 begins and the time at which the UL Burst 2 1390 ends can be adjusted depending on various factors, such as the number of legacy and new mobile stations involved, and the amount of network traffic.

In the frame structure 1300, a new mobile transmission in the DL Burst 2 1382 can be acknowledged in either the UL Burst 2 1390 or in the UL Burst 2 in a subsequent super-frame (not shown in FIG. 16). The legacy mobile transmission in the DL Burst 1 1380 can be acknowledged in either the UL Burst 1 1388 or in the UL Burst 1 in the subsequent super frame.

Figure 17:
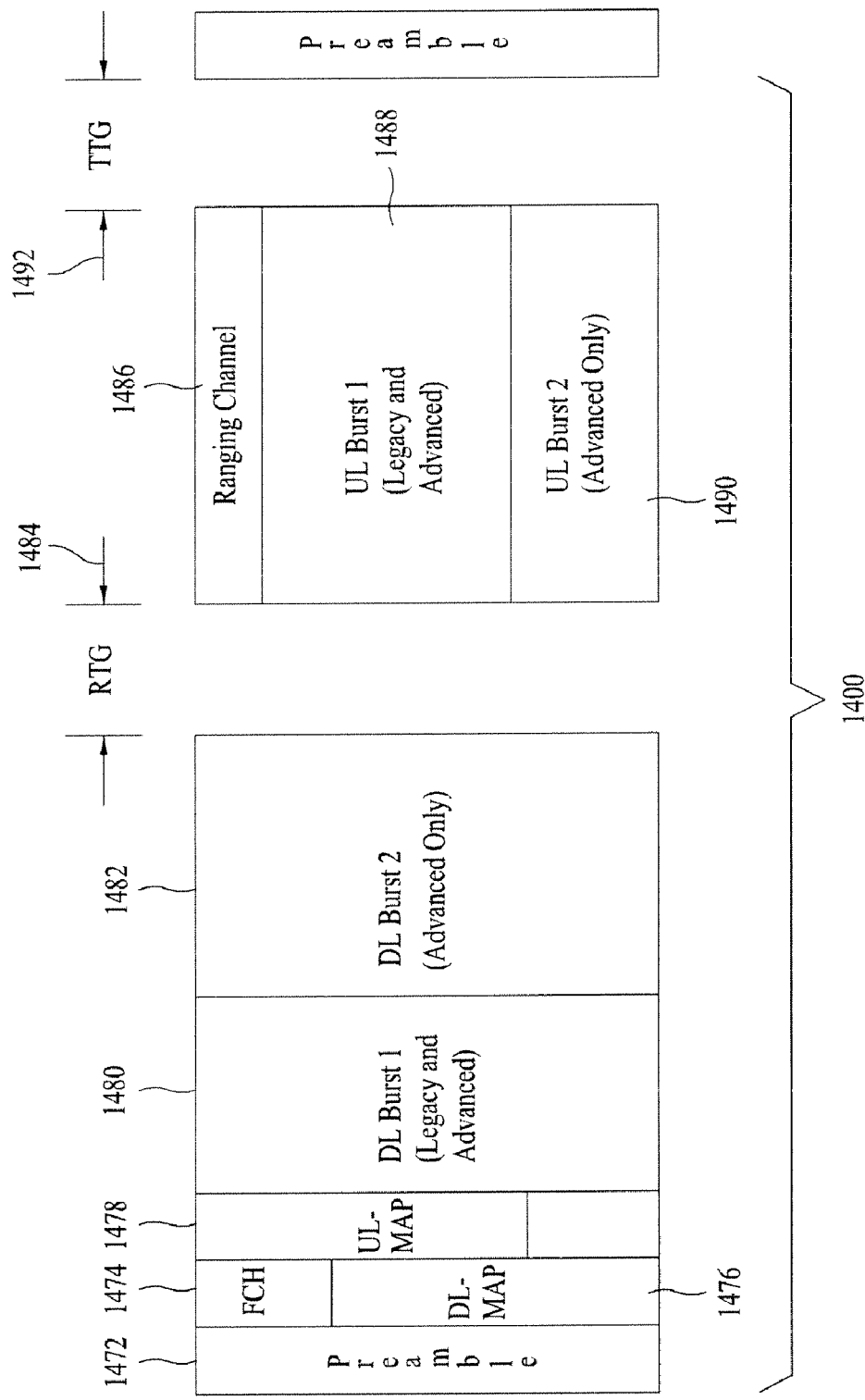
FIG. 17 shows a frame structure supporting legacy and new transmissions in accordance with one embodiment of the present invention.

FIG. 17 shows a frame structure supporting legacy and new transmissions in accordance with one embodiment of the present invention.

Frame structure 1400 includes a preamble 1472, an FCH 1474, a DL-MAP 1476, a UL-MAP 1478, a DL Burst 1 1480, a DL Burst 2 1482, an RTG 1484, a ranging channel 1486, a UL Burst 1 1488, a UL Burst 2 1490, and a TTG 1492.

As shown in FIG. 17, frame structure 1400 maintains the same number of switching points, that is, one RTG and one TTG, as the frame structure of the IEEE 802.16e standard. The frame structure 1400 shown in FIG. 17 supports the same or different numerologies for legacy and new transmissions. In one embodiment, legacy systems and new systems may use the same numerologies.

In the frame structure 1400, new mobile stations can be assigned to the DL Burst 1 1480, DL Burst 2 1482, UL Burst 1 1488, and UL Burst 2 1490, whereas legacy mobile stations can be assigned to the DL Burst 1 1480 and the UL Burst 1 1488. It should be understood that the DL Burst 2 1482 and the UL Burst 2 1490 are transparent to legacy mobile stations. As shown in FIG. 17, the UL Burst 1 1488 and the UL Burst 2 1490 can each have a ranging channel, such as ranging channel 1486. In one embodiment, the positions of DL Burst 1 1480 and the DL Burst 2 1482 in frame structure 1400 can be switched with one another.

The time at which the DL Burst 2 1482 begins and the time at which the UL Burst 1 1488 and the UL Burst 2 1490 begin can be adjusted depending on various factors, such as the number of legacy and new mobile stations involved, and the amount of network traffic. In order to support the DL Burst 1 1480, DL Burst 2 1482, UL Burst 1 1488, and UL Burst 2 1490, the DL-MAP 1476 and the UL-MAP 1478 are appropriately modified.

In the frame structure 1400, a new mobile transmission in the DL Burst 1 1480 can be acknowledged in either the UL Burst 1 1488 or the UL Burst 2 1490. For example, a delay sensitive transmission from a new mobile in the DL Burst 1 1480 can be acknowledged in the UL Burst 1 1488. As another example, a delay tolerant transmission from a new mobile in the DL Burst 1 1480 can be acknowledged in either the UL Burst 2 1490, or in the UL Burst 1 or the UL Burst 2 in a subsequent super-frame (not shown in FIG. 17).

In the frame structure 1400, a new mobile transmission in the DL burst 2 1482 can be acknowledged in the UL Burst 2 1490 if the Acknowledged/Not Acknowledged ("ACK/NACK") segment for the UL Burst 2 1490 is located in the later portion of the UL Burst 1 1488 and the UL Burst 2 1490, or the UL Burst 1 or the UL Burst 2 in a subsequent super-frame. Such acknowledgment depends on receiver complexity (time) of decoding the subpacket and generating the ACK/NAK.

The legacy mobile transmission in the DL Burst 1 1480 can be acknowledged in either the UL Burst 1 1488 or in the UL Burst 1 in a subsequent super frame (not shown in FIG. 17).

Figure 18:
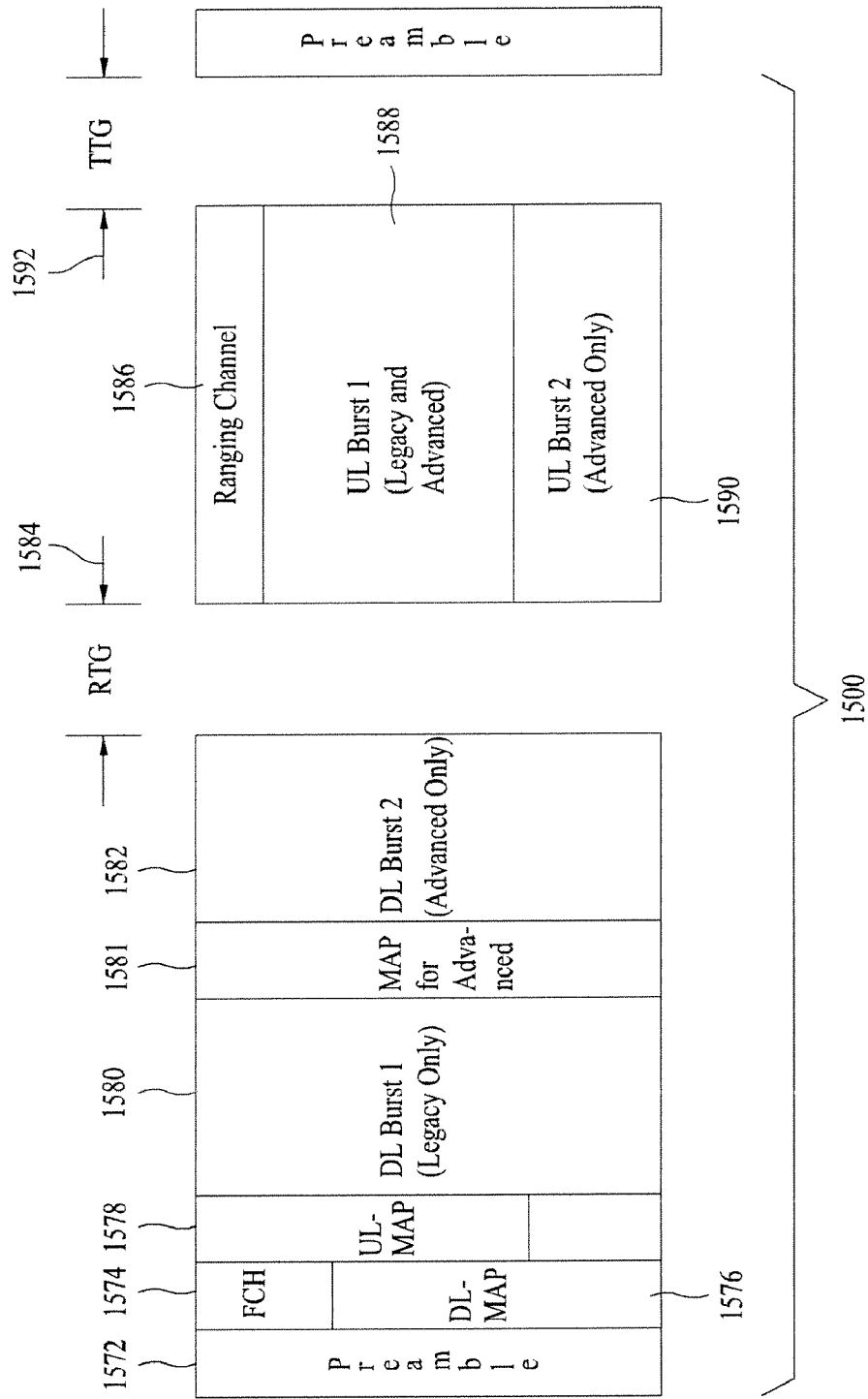
FIG. 18 shows a frame structure supporting legacy and new transmissions in accordance with one embodiment of the present invention.

FIG. 18 shows a frame structure supporting legacy and new transmissions in accordance with one embodiment of the present invention.

Frame structure 1500 includes a preamble 1572, an FCH 1574, a DL-MAP 1576, a UL-MAP 1578, a DL Burst 1 1580, new uplink and downlink MAP messages (MAP for Advanced) 1581, a DL Burst 2 1582, an RTG 1584, a ranging channel 1586, a UL Burst 1 1588, a UL Burst 2 1590, and a TTG 1592.

As shown in FIG. 18, frame structure 1400 maintains the same number of switching points, that is, one RTG and one TTG, as the frame structure of the IEEE 802.16e standard. The frame structure 1500 shown in FIG. 18 supports the same or different numerologies for legacy and new transmissions. In one embodiment, legacy systems and new systems may use the same numerologies.

In the frame structure 1500, new mobile stations can be assigned to the DL Burst 2 1582 and the UL Burst 2 1590, whereas legacy mobile stations can be assigned to the DL Burst 1 1580 and the UL Burst 1 1588. It should be understood that the DL Burst 2 1582 and the UL Burst 2 1590 are transparent to legacy mobile stations. As shown in FIG. 18, the UL Burst 1 1588 and the UL Burst 2 1590 can each have a ranging channel, such as ranging channel 1586.

In the frame structure 1500, legacy transmissions in the DL Burst 1 1580 and the UL Burst 1 1588 are supported by the legacy DL-MAP 1576 and UL-MAP 1578, and new transmissions in the DL Burst 2 1582 and the UL Burst 2 1590 are supported by the MAP for Advanced 1581. The times at which the MAP for Advanced 1581 and the UL Burst 2 1590 begin can be adjusted depending on various factors, such as the number of legacy and new mobile stations involved, and the amount of network traffic.

In the frame structure 1500, a new mobile transmission in the DL Burst 2 1582 can be acknowledged in either the UL Burst 2 1590 if the Acknowledged/Not Acknowledged ("ACK/NACK") segment for the UL Burst 2 1590 is located in the later portion of the UL Burst 1 1588 and the UL Burst 2 1590, or in the subsequent super-frame (not shown in FIG. 18). The legacy mobile transmission in the DL Burst 1 1580 can be acknowledged in either the UL Burst 1 1588 or in the UL Burst 1 in the subsequent super-frame.

A network coded ("NC") subframe in accordance with one embodiment of the present invention will now be discussed.

Figure 19:
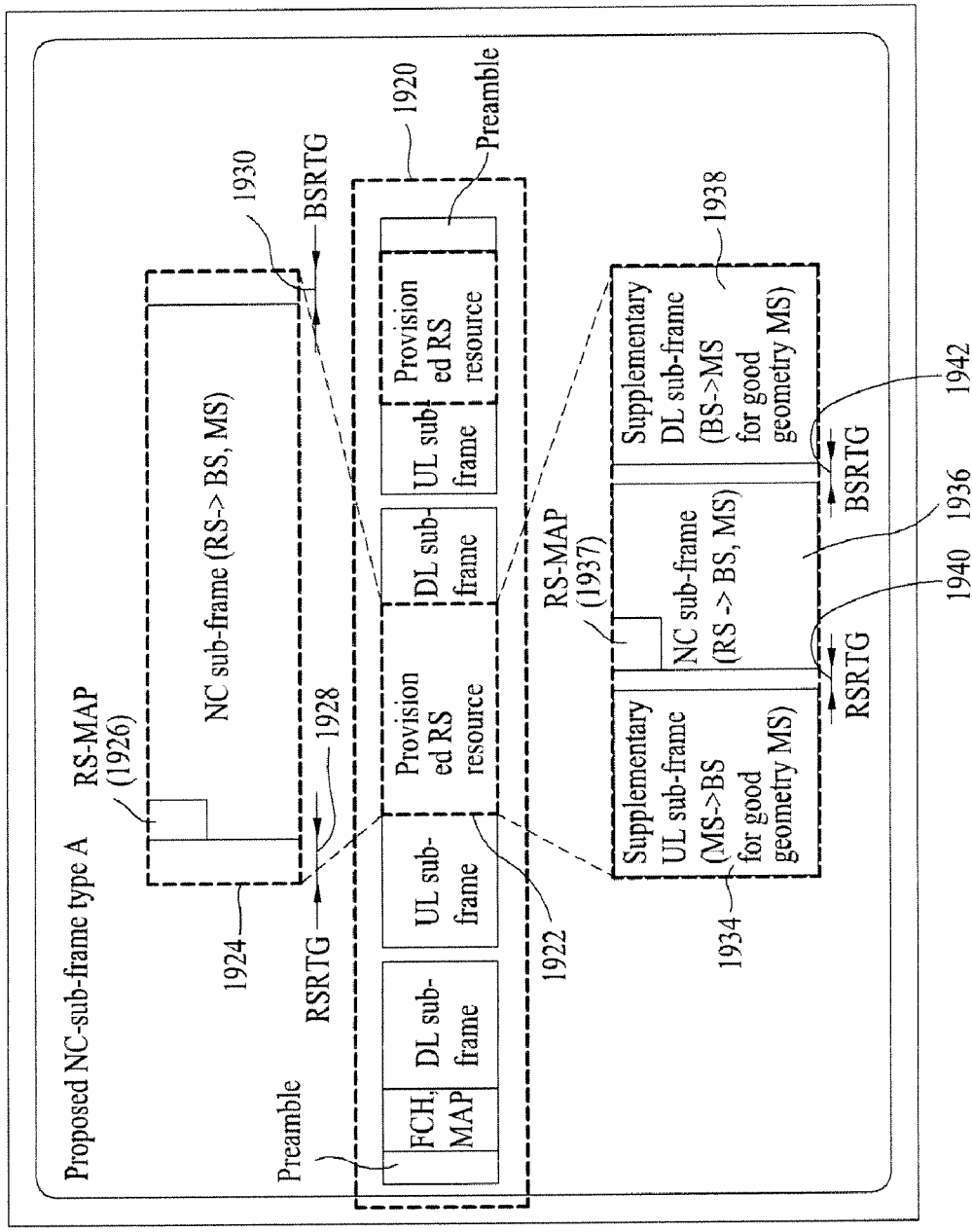
FIG. 19 shows a frame structure comprising a network coded ("NC") subframe in accordance with one embodiment of the present invention.

FIG. 19 shows a frame structure comprising a network coded ("NC") subframe in accordance with one embodiment of the present invention. As shown in FIG. 19, frame structure 1920 comprises a provisioned relay station ("RS") resource 1922.

In one embodiment and as shown in FIG. 19, the provisioned RS resource 1922 can comprise an NC subframe 1924 and a relay station MAP ("RS-MAP") 1926, a relay station receive/transmit transmission gap ("RSRTG") 1928, and a base station receive/transmit transmission gap ("BSRTG") 1930.

Alternatively, the provisioned RS resource 1922 can comprise supplementary UL subframe 1934, relay station MAP ("RS-MAP") 1937, NC subframe 1936, supplementary DL subframe 1938, relay station receive/transmit transmission gap ("RSRTG") 1940, and base station receive/transmit transmission gap ("BSRTG") 1942. Supplementary UL subframe 1934 enables an uplink transmission by a mobile station ("MS") having good geometry to a base station ("BS") and supplementary DL subframe 1938 enables a downlink transmission by a BS to an MS having good geometry.

Figure 20:
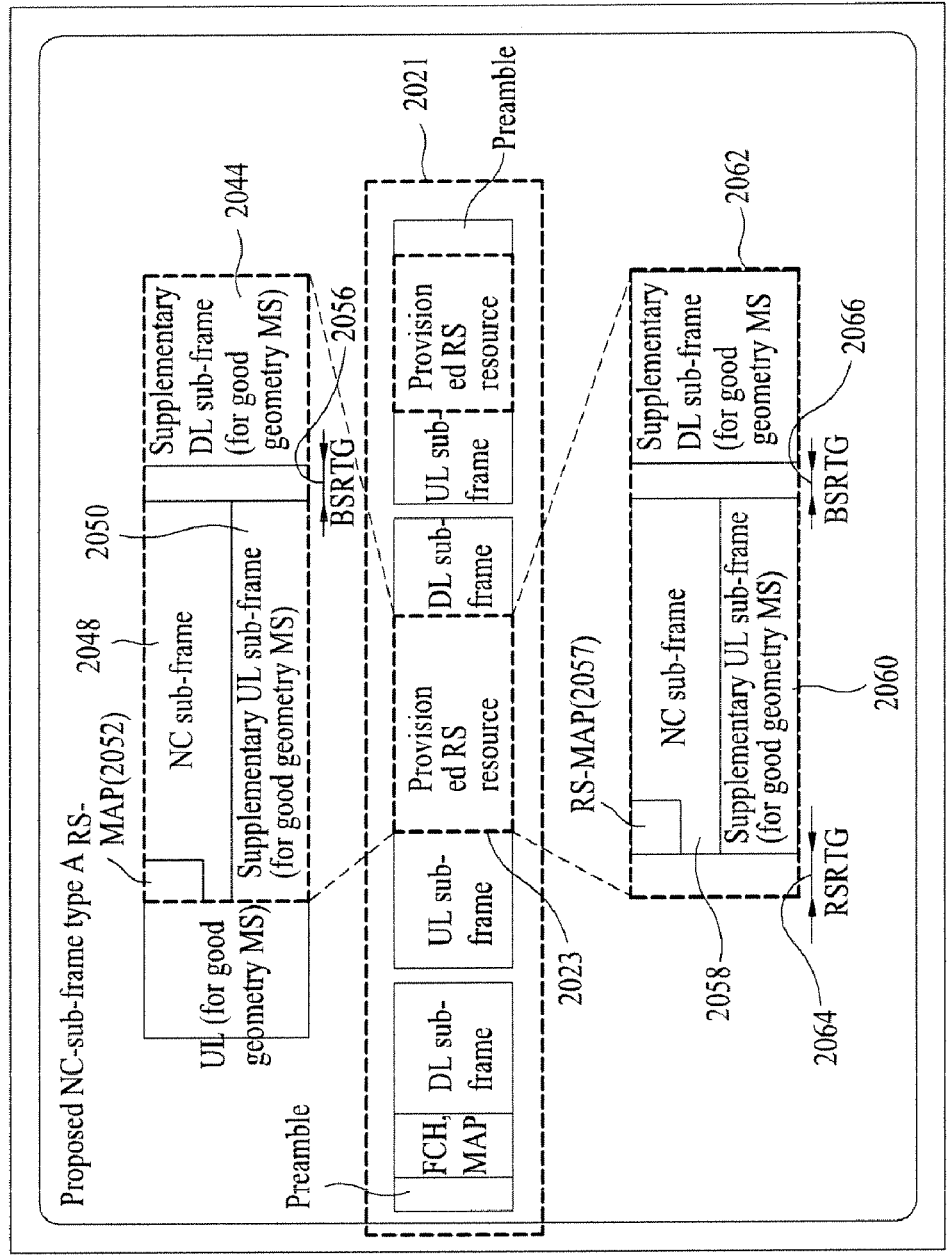
FIG. 20 shows a frame structure comprising a network coded ("NC") subframe in accordance with one embodiment of the present invention.

FIG. 20 shows a frame structure comprising a network coded ("NC") subframe in accordance with one embodiment of the present invention. As shown in FIG. 20, frame structure 2021 comprises a provisioned relay station ("RS") resource 2023.

As shown in FIG. 20, provisioned RS resource 2023 can comprise NC subframe 2048, relay station MAP ("RS-MAP") 2052, supplementary UL subframe 2050, supplementary DL subframe 2044, and base station receive/transmit transmission gap ("BSRTG") 2056.

Alternatively, the provisioned RS resource 2023 can comprise NC subframe 2058, RS-MAP 2057, supplementary UL subframe 2060, supplementary DL subframe 2062, relay station receive/transmit transmission gap ("RSRTG") 2064, and base station receive/transmit transmission gap ("BSRTG") 2066. Supplementary UL subframes 2050 and 2060 enable an uplink transmission by a mobile station ("MS") having good geometry to a base station ("BS") and supplementary DL subframes 2044 and 2062 enable a downlink transmission by a BS to an MS having good geometry.

Figure 21:
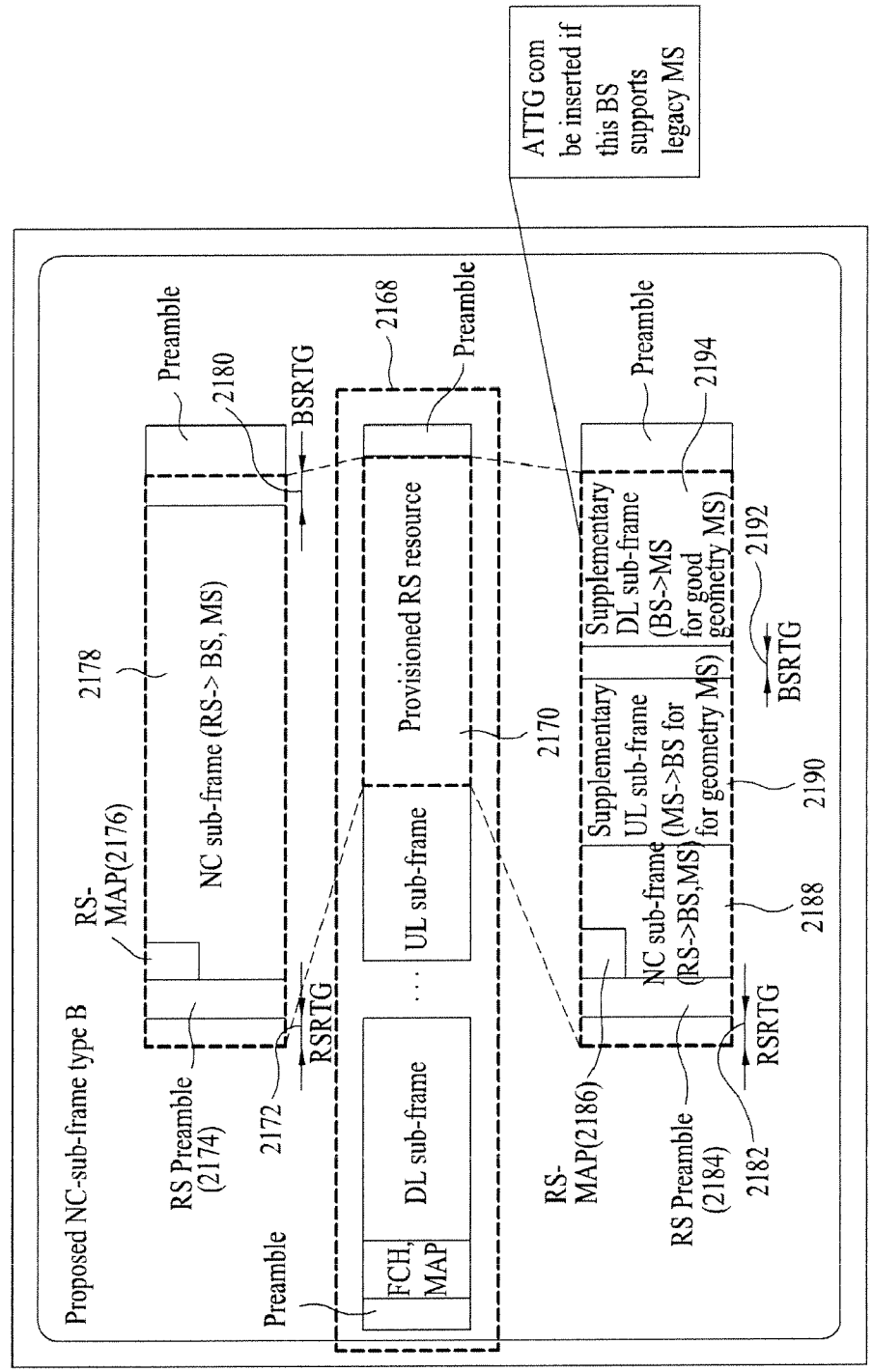
FIG. 21 shows a frame structure comprising a network coded ("NC") subframe in accordance with one embodiment of the present invention.

FIG. 21 shows a frame structure comprising a network coded ("NC") subframe in accordance with one embodiment of the present invention. As shown in FIG. 21, frame structure 2168 comprises a provisioned relay station ("RS") resource 2170.

As shown in FIG. 21, the provisioned RS resource 2170 can comprise a relay station receive/transmit transmission gap ("RSRTG") 2172, an RS preamble 2174, a relay station MAP ("RS-MAP") 2176, an NC subframe 2178, and a base station receive/transmit transmission gap ("BSRTG") 2180.

Alternatively, the provisioned RS resource 2170 can comprise a relay station receive/transmit transmission gap ("RSRTG") 2182, an RS preamble 2184, an RS-MAP 2186, an NC subframe 2188, a supplementary UL subframe 2190, a base station receive/transmit transmission gap ("BSRTG") 2192, and a supplementary DL subframe 2194. In one embodiment, a transmit/receive transmission gap (TTG) can be inserted after the supplementary DL subframe 2194 if the particular base station supports legacy mobile stations. The supplementary UL subframe 2190 enables an uplink transmission by a mobile station ("MS") having good geometry to a base station ("BS") and the supplementary DL subframe 2194 enables a downlink transmission by a BS to an MS having good geometry.

Figure 22:
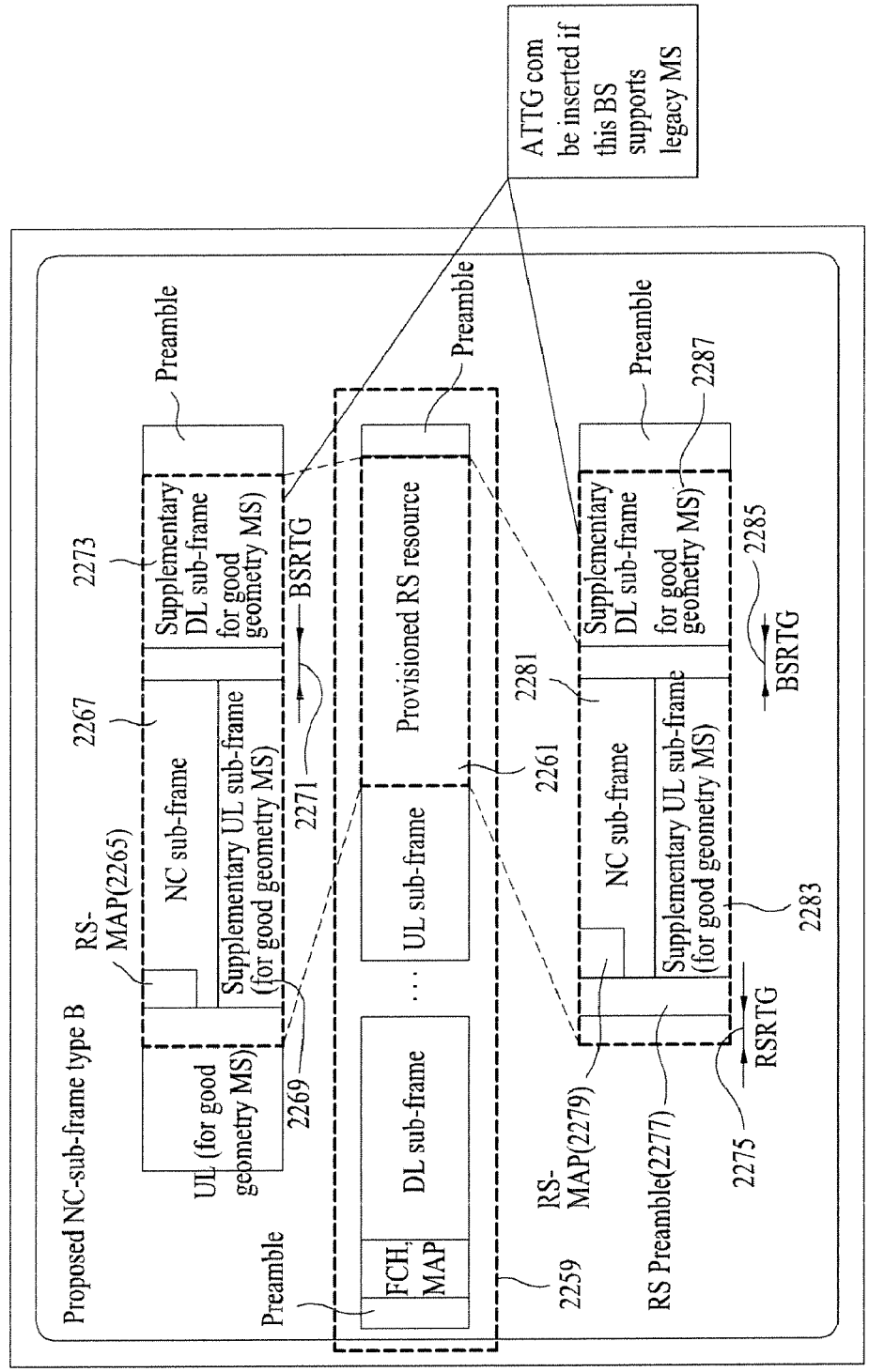
FIG. 22 shows a frame structure comprising a network coded ("NC") subframe in accordance with one embodiment of the present invention.

FIG. 22 shows a frame structure comprising a network coded ("NC") subframe in accordance with one embodiment of the present invention. As shown in FIG. 22, frame structure 2059 comprises a provisioned relay station ("RS") resource 2261.

As shown in FIG. 22, provisioned RS resource 2261 can comprise a relay station preamble 2263, relay station MAP ("RS-MAP") 2265, NC subframe 2267, supplementary UL subframe 2269, a base station receive/transmit transmission gap ("BSRTG") 2271, and a supplementary DL subframe 2273.

Alternatively, the provisioned RS resource 2261 can comprise relay station receive/transmit transmission gap ("RSRTG") 2275, a relay station ("RS") preamble 2277, an RS-MAP 2279, an NC subframe 2281, a supplementary UL subframe 2283, a base station receive/transmit transmission gap ("BSRTG") 2285, and a supplementary DL subframe 2287. In one embodiment, a transmit/receive transmission gap (TTG) can be inserted after the supplementary DL subframe 2273 or 2287 if the particular base station supports legacy mobile stations. The supplementary UL subframes 2269 and 2283 enable an uplink transmission by a mobile station ("MS") having good geometry to a base station ("BS") and the supplementary DL subframes 2273 and 2287 enable a downlink transmission by a BS to an MS having good geometry.

Figure 23:
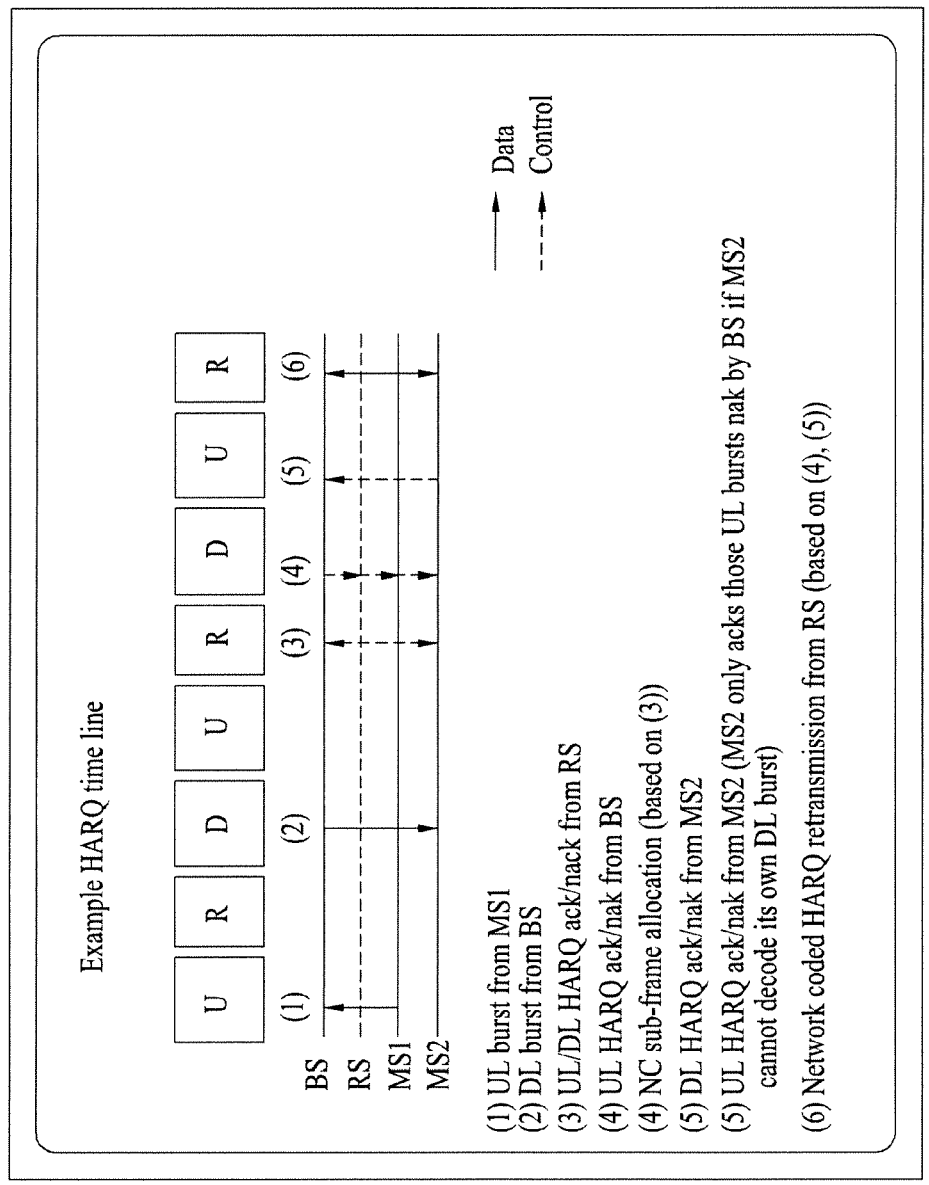
FIG. 23 shows an example of a HARQ time line in accordance with one embodiment of the present invention.

Each NC subframe described above may further comprise network coded hybrid automatic repeat-request ("HARQ") transmissions to a base station or a mobile a station, downlink hybrid automatic repeat-request ("DL HARQ") retransmissions to a mobile station, uplink hybrid automatic repeat-request ("UL HARQ") retransmissions to a base station, and hybrid automatic repeat-request ("HARQ") acknowledge/not acknowledged ("ACK/NAK") of a base station or a mobile station. An example of a HARQ time line is shown in FIG. 23.

Figure 24:
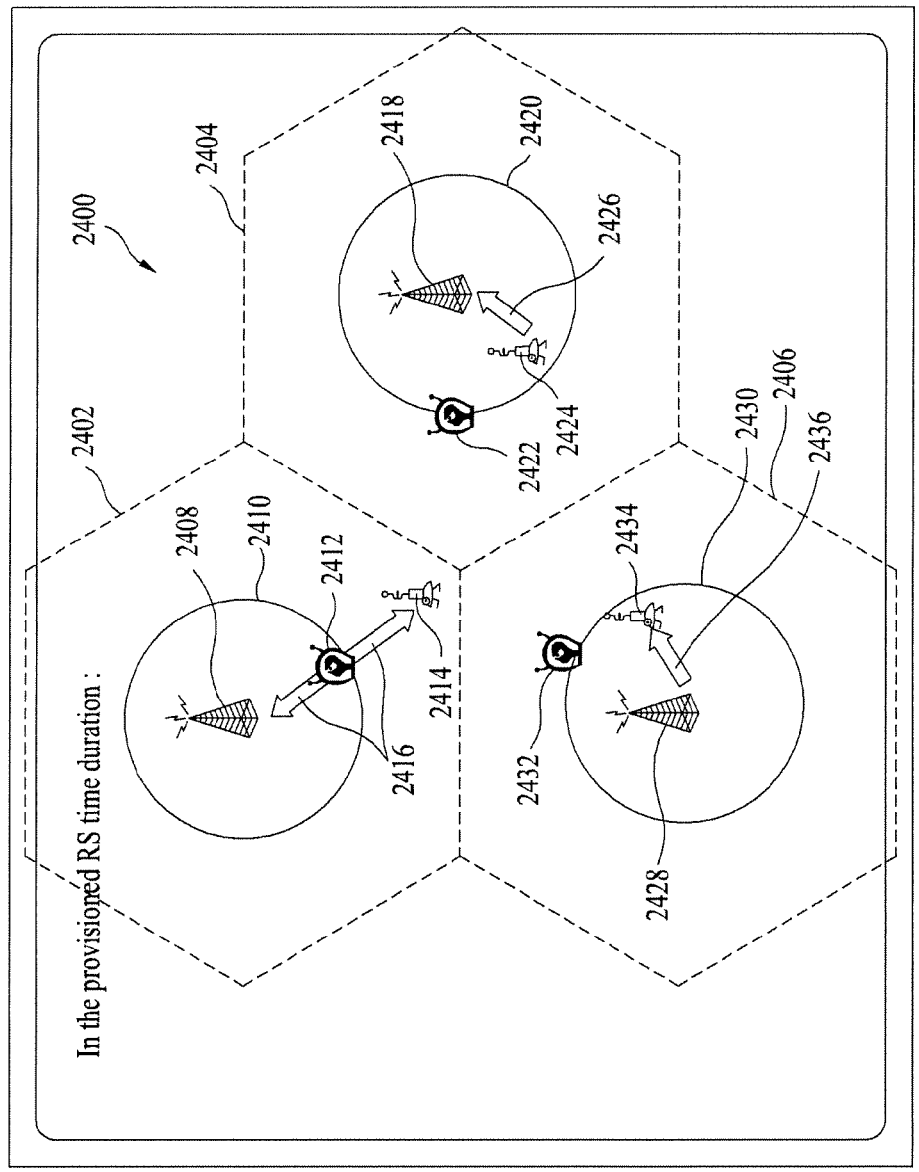
FIG. 24 shows a mobile communication network in accordance with one embodiment of the present invention.

FIG. 24 shows a mobile communication network in accordance with one embodiment of the present invention.

In FIG. 24, mobile communication system 2400 includes cells 2402, 2404, and 2406. As shown in FIG. 24, cell 2402 comprises base station 2408 with base station transmission range 2410, mobile station 2414, and relay station 2412. As also shown in FIG. 24, cell 2404 comprises base station 2418 with base station transmission range 2420, mobile station 2424, and relay station 2422. As further shown in FIG. 24, cell 2406 comprises base station 2428 with base station transmission range 2430, mobile station 2434, and relay station 2432.

In the mobile communication system 2400, the need for a relay station, such as relay station 2412, can vary from time to time based on the hybrid automatic repeat-request ("HARQ") acknowledge/not acknowledged ("ACK/NAK") of a base station, such as base station 2408, or a mobile station, such as mobile station 2414. Accordingly, a fixed relay station ("RS") resource, such as the provisioned RS resource of the present invention described with respect to the embodiments in FIGS. 19 through 22, is provisioned for each frame.

In one embodiment, the provisioned RS resource can be used for transmission of an NC subframe. In another embodiment, the provisioned RS resource can be used for a downlink ("DL") transmission and/or an uplink ("UL") transmission for mobile stations having good geometry where the relayed traffic is small.

For example, as shown in FIG. 24, during the time period of the provisioned RS resource, RS 2412 in cell 2402 broadcasts a transmission 2416 of a received DL transmission from base station 2408 and a received UL transmission from MS 2414, between BS 2408 and MS 2414. While RS 2412 is transmitting within cell 2402, DL and UL transmissions can be performed during the provisioned RS resource time period for mobile terminals having good geometry in other cells, such as cell 2404 and 2406, in which the corresponding relays, such as RS 2422 and 2432, do not broadcast information.

Depending on the type of implementation, it is possible that the present invention can take the form of an entirely hardware embodiment, an entirely software embodiment or an embodiment containing both hardware and software elements. A software embodiment may include, but not be limited to, firmware, resident software, microcode, etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method of transmitting uplink data bursts in a mobile communication system comprising a plurality of mobile terminals, the method comprising:

receiving first information indicating correspondence between at least a first communication scheme mobile terminal and information to be transmitted in at least a first uplink data burst and a correspondence between at least a second communication scheme mobile terminal and information to be transmitted in at least a second uplink data burst; and transmitting information in the at least a first uplink data burst or the at least a second uplink data burst according to the first information, wherein the at least a first uplink data burst comprises information from both the at least a first communication scheme mobile terminal and the at least a second communication scheme mobile terminal, wherein the at least a second uplink data burst comprises information from only the at least a second communication scheme mobile terminal, wherein a time division multiplexing (TDM) scheme is applied between the at least a first uplink data burst and the at least a second uplink data burst, wherein a first region for the at least a second uplink data burst from only the at least a second communication scheme mobile terminal is immediately followed by a second region for the at least a first uplink data burst from both the at least a first communication scheme mobile terminal and the at least a second communication scheme mobile terminal in an uplink time duration, wherein one ranging channel is transmitted in the uplink time duration, and wherein the one ranging channel is a frequency division multiplexing (FDM) multiplexed with the first region and the second region in the uplink time duration.

2. The method of claim 1, wherein a time period during which the at least a first uplink data burst and the at least a second uplink data burst are transmitted is utilized by both the at least a first communication scheme mobile terminal and the at least a second communication scheme mobile terminal for providing information or making requests to a network.

3. The method of claim 1, further comprising receiving second information indicating at least one point in time at which the at least a first uplink data burst or the at least a second uplink data burst is transmitted.

4. The method of claim 3, wherein transmitting information in the at least a first uplink data burst or the at least a second uplink data burst comprises utilizing the first information to determine a start point of the at least a first uplink data burst or the at least a second uplink data burst.

5. A method of transmitting uplink data bursts in a mobile communication system comprising a plurality of mobile terminals, the method comprising:

receiving first information indicating correspondence between at least a first communication scheme mobile terminal and information to be transmitted in a first uplink data burst;

receiving second information indicating correspondence between at least a second communication scheme mobile terminal and information to be transmitted in a second uplink data burst; and transmitting information in either the first uplink data burst or the second uplink data burst according to the first information or the second information, wherein the first uplink data burst comprises information from both the at least a first communication scheme mobile terminal and the at least a second communication scheme mobile terminal, wherein the second uplink data burst comprises information from only the at least a second communication scheme mobile terminal, wherein a time division multiplexing (TDM) scheme is applied between the first uplink data burst and the second uplink data burst, wherein a first region for the second uplink data burst from only the at least a second communication scheme mobile terminal is immediately followed by a second region for the first uplink data burst from the at least a first communication scheme mobile terminal and the at least a second communication mobile terminal in an uplink time duration, wherein one ranging channel is transmitted in the uplink time duration, and wherein the one ranging channel is a frequency division multiplexing (FDM) multiplexed with the first region and the second region in the uplink time duration.

6. The method of claim 5, further comprising receiving third information indicating at least one point in time at which the first uplink data burst or the second uplink data burst is transmitted.

7. The method of claim 6, wherein transmitting information in either the first uplink data burst or the second uplink data burst comprises utilizing the first information to determine a start point of at least the first uplink data burst or the second uplink data burst.

8. The method of claim 5, wherein a time period during which the first uplink data burst and the second uplink data burst are transmitted is utilized by both the at least a first communication scheme mobile terminal and the at least a second communication scheme mobile terminal for providing information or making requests to a network.

* * * * *